(12) United States Patent  (10) Patent No.: US 7,649,744 B2
Zadesky et al.  (45) Date of Patent: Jan. 19, 2010

(54) HANDHELD COMPUTING DEVICE

(75) Inventors: Stephen Paul Zadesky, Portola Valley, CA (US); Stephen Brian Lynch, Portola Valley, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 12/395,570

(22) Filed: Feb. 27, 2009

(65) Prior Publication Data

US 2009/0164035 A1  Jun. 25, 2009

Related U.S. Application Data

(62) Division of application No. 10/884,172, filed on Jul. 2, 2004, now Pat. No. 7,515,431.

(51) Int. Cl.
*H05K 5/00* (2006.01)
(52) U.S. Cl. .................... 361/752; 174/50.51; 174/50; 174/54
(58) Field of Classification Search ............... 361/728, 361/752, 793, 794; 174/50.51, 50, 54
See application file for complete search history.

(56) References Cited

U.S. PATENT DOCUMENTS

| | | | |
|---|---|---|---|
| D264,969 S | 6/1982 | McGourty | |
| 4,976,435 A | 12/1990 | Shatford et al. | |
| 5,192,082 A | 3/1993 | Inoue et al. | |
| 5,661,632 A | 8/1997 | Register | |
| 5,917,545 A | 6/1999 | Kowno et al. | |
| D412,940 S | 8/1999 | Kato et al. | |
| 5,964,661 A | 10/1999 | Dodge | |
| 6,058,356 A * | 5/2000 | Swanson et al. | 702/99 |
| D430,169 S | 8/2000 | Scibora | |
| 6,122,526 A | 9/2000 | Parulski et al. | |
| D432,523 S | 10/2000 | Grinkus et al. | |
| 6,127,986 A | 10/2000 | Wen et al. | |
| D437,860 S | 2/2001 | Suzuki et al. | |
| 6,220,680 B1 | 4/2001 | Chen | |
| 6,227,966 B1 | 5/2001 | Yokoi | |

(Continued)

OTHER PUBLICATIONS

"Maxtor OneTouch II FireWire and USB", Maxtor.com, http://www.maxtor.com/portal/site/Maxtor/menuitem.ba88f6d7cf664718376049b2913460 . . . downloaded Dec. 1, 2004.

(Continued)

*Primary Examiner*—Dean A. Reichard
*Assistant Examiner*—Abiy Getachew
(74) *Attorney, Agent, or Firm*—Beyer Law Group LLP

(57) ABSTRACT

A handheld computing device and handheld music player are disclosed. The handheld computing device includes a seamless enclosure formed from an extruded tube. The extruded tube includes open ends and internal rails which serve as a guide for slidably assembling an operational assembly through the open ends of the extruded tube, a reference surface for positioning the operational assembly relative to an access opening in the seamless enclosure, and a support structure for supporting the operational assembly during use. The handheld music player includes an elongated extruded tube extending along a longitudinal axis. The elongated extruded tube has a first open end and a second open end opposite the first open end, and defines an internal lumen which is sized and dimensioned for slidable receipt of operational components of the handheld music player. The lumen includes rails for guiding the operational components to their desired position within the lumen.

20 Claims, 11 Drawing Sheets

U.S. PATENT DOCUMENTS

| | | | |
|---|---|---|---|
| 6,249,427 B1 | 6/2001 | Carroll | |
| 6,254,477 B1 | 7/2001 | Sasaki et al. | |
| 6,262,785 B1 | 7/2001 | Kim | |
| 6,292,556 B1 | 9/2001 | Laetsch | |
| D448,810 S | 10/2001 | Goto | |
| D450,713 S | 11/2001 | Masamitsu et al. | |
| 6,314,483 B1 | 11/2001 | Goto et al. | |
| 6,319,631 B1 | 11/2001 | Bay et al. | |
| D452,250 S | 12/2001 | Chan | |
| D455,793 S | 4/2002 | Lin | |
| 6,449,164 B1 * | 9/2002 | Gershfeld | 361/752 |
| D468,365 S | 1/2003 | Bransky et al. | |
| D469,109 S | 1/2003 | Andre et al. | |
| D472,245 S | 3/2003 | Andre et al. | |
| 6,643,918 B2 | 11/2003 | Ortiz et al. | |
| D483,809 S | 12/2003 | Lim | |
| D489,731 S | 5/2004 | Huang | |
| D490,068 S | 5/2004 | Chen | |
| 6,790,556 B1 | 9/2004 | Meitav et al. | |
| 6,795,715 B1 | 9/2004 | Kubo et al. | |
| D497,618 S | 10/2004 | Andre et al. | |
| 6,837,435 B2 | 1/2005 | Kehoe et al. | |
| 6,840,311 B2 | 1/2005 | Ghosh et al. | |
| D506,476 S | 6/2005 | Andre et al. | |
| D515,545 S | 2/2006 | Griffin | |
| D516,579 S | 3/2006 | Nakamura | |
| 7,013,164 B2 | 3/2006 | Lin | |
| D521,023 S | 5/2006 | Kim et al. | |
| 7,046,230 B2 | 5/2006 | Zadesky et al. | |
| 7,070,881 B2 | 7/2006 | Kishiyama et al. | |
| 7,397,003 B2 * | 7/2008 | Cox et al. | 177/238 |
| 7,495,659 B2 | 2/2009 | Marriott et al. | |
| 7,515,431 B1 * | 4/2009 | Zadesky et al. | 361/752 |
| 2001/0034222 A1 | 10/2001 | Roustaei et al. | |
| 2002/0195562 A1 | 12/2002 | Salapow et al. | |
| 2003/0100275 A1 | 5/2003 | Hsu et al. | |
| 2004/0053014 A1 | 3/2004 | Sato | |
| 2004/0224638 A1 | 11/2004 | Fadell et al. | |
| 2005/0052425 A1 | 3/2005 | Zadesky et al. | |

OTHER PUBLICATIONS

"Maxtor OneTouch USB OneTouch Family", Maxtor.com, http://www.maxtor.com/portal/site/Maxtor/menuitem.ba88f6d7cf664718376049b2913460 . . . downloaded Dec. 1, 2004.

CoolerMaster Wave Master Black Aluminum Case Review:, PCStats.com, http://www.pcstats.com/articleview.cfm?articieID=1552, Dowloaded Dec. 1, 2004.

Office Action mailed Nov. 16, 2005 from U.S. Appl. No. 10/884,172.

Final Office Action mailed May 4, 2006 from U.S. Appl. No. 10/884,172.

Office Action mailed Jul. 27, 2007 from U.S. Appl. No. 10/884,172.

Final Office Action mailed Dec. 28, 2007 from U.S. Appl. No. 10/884,172.

Office Action mailed Aug. 6, 2008 from U.S. Appl. No. 10/884,172.

Notice of Allowance mailed Dec. 1, 2008 from U.S. Appl. No. 10/884,172.

Supplemental Notice of Allowability mailed Feb. 4, 2009 from U.S. Appl. No. 10/884,172.

U.S. Appl. No. 29/196,832, filed Jan. 5, 2004.

* cited by examiner

HANDHELD COMPUTING DEVICE

CROSS REFERENCE TO RELATED APPLICATIONS

This application is a Divisional of, and claims the benefit of priority under 35 U.S.C. §120 to, application Ser. No. 10/884,172, filed on Jul. 2, 2004 and entitled "HANDHELD COMPUTING DEVICE" which is hereby incorporated herein by reference.

This application is also related to the following U.S. Patent Applications, which are hereby incorporated herein by reference: application Ser. No. 29/196,832, filed on Jan. 5, 2004 and entitled "MEDIA DEVICE," now abandoned; application Ser. No. 10/643,256, filed on Aug. 18, 2003 and entitled "MOVABLE TOUCHPAD WITH ADDED FUNCTIONALITY," now U.S. Publication No. 2005-0052425; application Ser. No. 10/188,182, filed on Jul. 1, 2002 and entitled "TOUCHPAD FOR HANDHELD DEVICE," now U.S. Pat. No. 7,046,230, issued on May 16, 2006; application Ser. No. 10/722,948, filed on Nov. 25, 2003 and entitled "TOUCHPAD FOR HANDHELD DEVICE," now U.S. Pat. No. 7,495,659, issued on Feb. 24, 2009 and application Ser. No. 10/423,490, filed on Apr. 25, 2003 and entitled "MEDIA PLAYER SYSTEM," now U.S. Publication No. 2004-0224638.

BACKGROUND OF THE INVENTION

1. Field of the Invention

The present invention relates generally to portable computing devices. More particularly, the present invention relates to enclosures of portable computing devices and methods of assembling portable computing devices.

2. Description of the Related Art

In recent years, portable computing devices such as laptops, PDAs, media players, cellular phones, etc., have become small, light and powerful. One factor contributing to this phenomena is in the manufacturer's ability to fabricate various components of these devices in smaller and smaller sizes while in most cases increasing the power and or operating speed of such components. Unfortunately, the trend of smaller, lighter and powerful presents a continuing design challenge in the design of some components of the portable computing devices.

One design challenge associated with the portable computing devices is the design of the enclosures used to house the various internal components of the portable computing devices. This design challenge generally arises from two conflicting design goals—the desirability of making the enclosure lighter and thinner, and the desirability of making the enclosure stronger and more rigid. The lighter enclosures, which typically use thinner plastic structures and fewer fasteners, tend to be more flexible and therefore they have a greater propensity to buckle and bow when used while the stronger and more rigid enclosures, which typically use thicker plastic structures and more fasteners, tend to be thicker and carry more weight. Unfortunately, increased weight may lead to user dissatisfaction, and bowing may damage the internal parts of the portable computing devices.

Furthermore, in most portable computing devices, the enclosures are mechanical assemblies having multiple parts that are screwed, bolted, riveted, or otherwise fastened together at discrete points. For example, the enclosures typically have included an upper casing and a lower casing that are placed on top of one another and fastened together using screws. These techniques typically complicate the housing design and create aesthetic difficulties because of undesirable cracks, seams, gaps or breaks at the mating surfaces and fasteners located along the surfaces of the housing. For example, a mating line surrounding the entire enclosure is produced when using an upper and lower casing. Not only that, but assembly is often a time consuming and cumbersome process. For example, the assembler has to spend a certain amount of time positioning the two parts and attaching each of the fasteners. Furthermore, assembly often requires the assembler to have special tools and some general technical skill.

Another design challenge is in techniques for mounting structures within the portable computing devices. Conventionally, the structures have been laid over one of the casings (upper or lower) and attached to one of the casings with fasteners such as screws, bolts, rivets, etc. That is, the structures are positioned in a sandwich like manner in layers over the casing and thereafter fastened to the casing. This methodology suffers from the same drawbacks as mentioned above, i.e., assembly is a time consuming and cumbersome.

In view of the foregoing, there is a need for improved enclosures for portable computing devices. Particularly, enclosures that are more cost effective, smaller, lighter, stronger and aesthetically more pleasing than current enclosure designs. In addition, there is a need for improvements in the manner in which structures are mounted within the enclosures. For example, improvements that enable structures to be quickly and easily installed within the enclosure, and that help position and support the structures in the enclosure.

SUMMARY OF THE INVENTION

The invention relates, in one embodiment, to a handheld computing device. The computing device includes a seamless enclosure formed from an extruded tube. The extruded tube includes open ends and internal rails which serve as a guide for slidably assembling a user interface assembly through the open ends of the extruded tube, a reference surface for positioning the user interface assembly relative to an access opening in the seamless enclosure, and a support structure for supporting the user interface assembly during use.

The invention relates, in another embodiment, to a method of assembling a handheld computing device. The method includes providing an enclosure formed from an extruded tube including open ends and internal rails. The method also includes providing operational components for performing operations associated with the handheld computing device. The method further includes inserting the operational components into the extruded tube through an open end of the extruded tube. The operational components slide along the internal rail during insertion. The internal rails also help to locate the operational components in their desired position within the extruded tube. The method additionally includes securing the operational components to the extruded tube.

The invention relates, in another embodiment, to a handheld music player. The hand held music player includes an elongated extruded tube extending along a longitudinal axis, and having a first open end and a second open end opposite the first open end. The elongated extruded tube defines an internal lumen which is sized and dimensioned for slidable receipt of operational components of the handheld music player. The lumen includes rails for guiding the operational components to their desired position within the lumen.

The invention relates, in another embodiment, to a handheld computing device. The handheld computing device includes a seamless enclosure having a substantially planar front surface. The planar front surface is configured to present a user interface sub system of the handheld device. The seamless enclosure is formed from an extruded tube having open ends and internal rails. The open ends is configured to receive the user interface sub system therethrough during assembly of the handheld device. The internal rails are configured to locate the user interface sub system in its desired position relative to the planar front surface of the enclosure during assembly of the handheld computing device.

The invention relates, in another embodiment, to a method of manufacturing a handheld computing device. The method includes forming an enclosure for the handheld device. The formation includes at least extruding a tube with a substantially planar surface and internal rails and cutting the tube to a desired length where the cutting operation produces openings at each end of the tube. The method also includes forming one or more holes in the substantially planar surface. The method further includes inserting a display assembly into the tube through one of the openings. The display assembly includes a substantially planar printed circuit board and a display. The printed circuit board slides along the internal rails during insertion. The internal rails locate the display behind a first hole and adjacent the planar surface of the tube. The method additionally includes inserting a planar input device into the tube through one of the openings. The planar input device slides along the internal rails during insertion. The internal rails locate the input device behind a second hole and adjacent the planar surface of the tube.

The invention relates, in another embodiment, to a planar retaining plate. The retaining plate includes a body. The retaining plate also includes a first set of flexure arms extending from a first side of the body and a second set of flexure arms extending from a second side of the body opposite the first side. Each of the flexure arms are configured for insertion into a different slot located on a device enclosure in order to secure the retaining plate to the device enclosure. The retaining plate serves as a reference surface to various components located internal or external to the device enclosure.

The invention relates, in another embodiment, to an interface assembly of a handheld computing device. The handheld computing device has an enclosure and a first electronic device contained therein. The interface assembly includes a printed circuit board (PCB) divided into a flexure portion, a first base portion and a second base portion. The flexure portion is positioned between the first and second base portions. The flexure portion allows the first base portion to move relative to the second base portion. The second base portion is attached to the first electronic device. The interface assembly also includes a second electronic device attached to the first base portion, and operatively coupled to the first electronic device. The interface assembly further includes a support plate attached to the second electronic device. The flexure portion is configured to flex so that the first base portion shifts relative to the second base portion thereby allowing the plate to be correctly aligned with the enclosure during assembly of the handheld computing device.

BRIEF DESCRIPTION OF THE DRAWINGS

The invention will be readily understood by the following detailed description in conjunction with the accompanying drawings, wherein like reference numerals designate like structural elements, and in which.

DETAILED DESCRIPTION OF THE INVENTION

The invention generally pertains to portable computing devices and more particularly to components of and methods for assembling portable computing devices. One aspect of the invention relates to a seamless enclosure that includes open ends and internal rails which serve as a guide for slidably assembling the internal components of the portable computing devices through the open ends of the seamless enclosure, as well as positioning and supporting the internal components in their assembled position within the seamless enclosure. The seamless enclosure may for example be formed via an extrusion process. Another aspect of the invention relates to a planar retaining plate, which serves as a multi-positional reference surface to various components of the portable computing devices. The retaining plate may for example be assembled within the lumen of the seamless enclosure to provide a reference surface to internal and external parts of the portable computing device. Another aspect of the invention relates to assemblies capable of flexing in order to align interfacing parts. For example, aligning a plate within the lumen of the seamless enclosure. Yet another aspect of the invention relates to a method of manufacturing a portable computing device. The method may include extruding a tube with a substantially planar surface and internal rails, cutting the tube to a desired length, forming one or more access openings in the substantially planar surface, sliding the user interface assembly along the internal rails into the tube, and thereafter locating and supporting the user interface assembly behind an access opening and adjacent the planar surface of the tube via the internal rails.

These and other embodiments of the invention are discussed below with reference to FIGS. 1-10. However, those skilled in the art will readily appreciate that the detailed description given herein with respect to these figures is for explanatory purposes as the invention extends beyond these limited embodiments.

Figure 1:
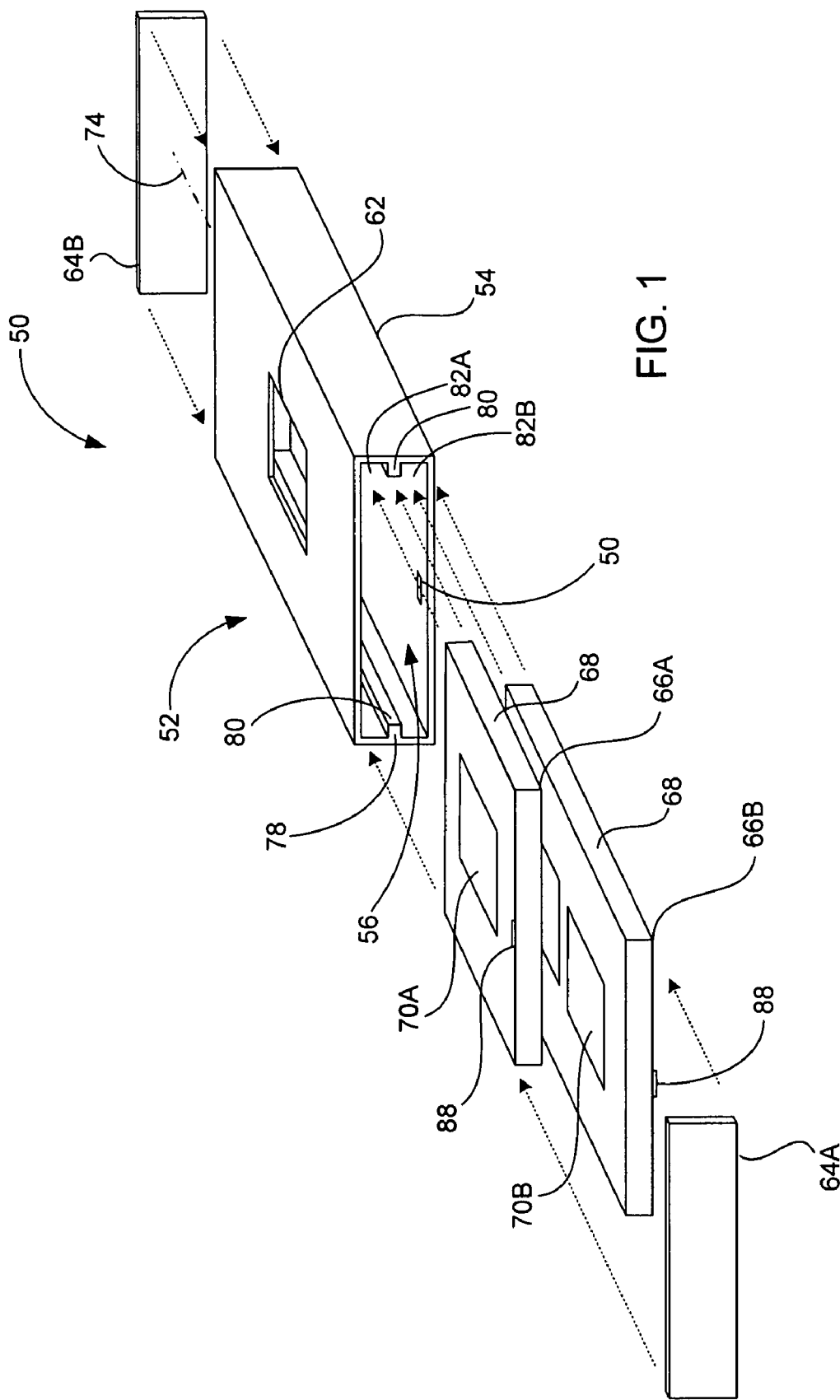
FIG. 1 is an exploded perspective diagram of an electronic device, in accordance with one embodiment of the present invention.

FIG. 1 is an exploded perspective diagram of an electronic device 50, in accordance with one embodiment of the present invention. The device 50 may be sized for one-handed operation and placement into small areas such as a pocket, i.e., the device 50 can be a handheld pocket sized electronic device. By way of example, the electronic device 50 may correspond to a computer, media device, telecommunication device and/or the like.

The device 50 includes a housing 52 that encloses and supports internally various electrical components (including for example integrated circuit chips and other circuitry) to provide computing operations for the device 50. The housing 52 also defines the shape or form of the device 50. That is, the contour of the housing 52 may embody the outward physical appearance of the device 50. The housing 52 generally includes a main body 54 in the form of an integral tube. By integral, it is meant that the main body is a single complete unit. By being integrally formed, the main body has a substantially seamless appearance, which is unlike conventional housings, which include two parts that are fastened together thereby forming a seam therebetween. Because of the tube like configuration, the main body 54 defines a cavity 56 therethrough between a first open end 58 and second open end 60 located opposite the first open end 58. The main body 54 also includes one or more windows 62, which provide access to the electrical components, particularly the user interface elements, when they are assembled inside the cavity 56 of the main body 54.

In order to seal the main body 54, the housing 52 additionally includes a pair of end caps 64A and 64B. Each of the end caps 64 is configured to cover one of the open ends 58 or 60 thereby forming a fully enclosed housing system. The end caps 64 may be formed from similar or different materials as the main body 54. Furthermore, the end caps 64 may be attached to the main body 54 using a variety of techniques, including but not limited to, fasteners, glues, snaps, and/or the like. In some cases, the end caps 64 may be positioned on the surface of the open ends 58 and 60. If so, they typically have the same shape as the outer periphery of the main body 54. In order to eliminate gaps, cracks or breaks on the front and side surfaces, the end caps 64 may alternatively be placed inside the cavity 56 at each of the ends. In this arrangement, the outer periphery of the end cap 64 generally matches the inner periphery of the main body 54. This implementation is typically preferred in order to form a housing 52 with a uniform and seamless appearance, i.e., no breaks when looking directly at the front, back or side of the housing.

The cross sectional shape, including both the outer and inner shapes, of the main body 54 may be widely varied. They may be formed from simple or intricate shapes whether rectilinear and/or curvilinear. For hand held devices, it is typically preferred to use a shape that better fits the hand (e.g., form fits). By way of example, a rectangle with curved edges or an oval or pill shaped cross section having curvature that more easily receives the hand may be used. It should be noted that the inner cross sectional shape may be the same or different from the external cross sectional shape of the main body. For example, it may be desirable to have a pill shaped external and a rectangularly shaped interior, etc. In addition, although not a requirement, the front surface of the main body 54 may be substantially planar for placement of the user interface of the device 50.

The device 50 also includes one or more electronic subassemblies 66. The subassemblies 66 each include a carrier 68 and one or more operational components 70 of the electronic device 50. The carrier 68 provides a structure for carrying the operational components 70 and supporting them when assembled inside the housing 52. By way of example, the carrier 68 may be formed from plastics, metals and/or a printed circuit board (PCB). The operational components 70, on the other hand, perform operations associated with the computing device 50. The operational components 70 may for example include user interface elements 70A and/or circuit elements 70B. The user interface elements 70A allow a user to interact with the computing device 50. By way of example, the user interface elements 70A may correspond to a display and/or an input device such as a keypad, touch pad, touch screen, joystick, trackball, buttons, switches and/or the like. The circuit components 70B, on the other hand, perform operations such as computing operations for the computing device 50. By way of example, the computing components 70B may include a microprocessor, memory, hard drive, battery, I/O connectors, switches, power connectors, and/or the like.

During assembly, the subassemblies 66 are positioned inside the cavity 56 of the main body 54. In particular, the subassemblies 66 are inserted into one of the open ends 58 or 60 of the main body 54 mainly along a longitudinal axis 74 of the main body 54 to their desired position within the housing 52. Once positioned inside the cavity 56, the end caps 64 of the housing 52 may be attached to the main body 54 in order to fully enclose the housing 52 around the subassemblies 66. In most cases, the user interface elements 70A are positioned relative to the window opening 62 so that a user may utilize the user interface elements 70A. By way of example, the window 62 may allow viewing access to a display or finger access to a touch pad or button.

In order to more efficiently assemble the electronic subassemblies 66 inside the cavity 56, the device 50 includes an internal rail system 78 disposed inside the cavity 56 of the main body 54. In most cases, the internal rail system 78 is integrally formed with the main body 54, i.e., formed as a single part. The internal rail system 78 is configured to receive the various subassemblies 66 and guide them to their desired position within the main body 54 when the subassemblies 66 are inserted through one of the open ends 58 or 60. The internal rail system 78 enables the subassemblies 66 to be easily and quickly assembled within the device 50. For example, the rail system 78 provides for insertion (or removal) with minimal effort and without tools. The internal rail system 78 also helps support and store the subassemblies 66 in an organized manner within the device 50. By way of example, the rail system 78 may store the subassemblies 66 in a stacked parallel arrangement thereby using available space more efficiently.

As shown, the rail system 78 includes at least one set of opposed rails 80, each of which extends longitudinally through the cavity 56 and each of which protrudes from the inner sides of the main body 54. The rails 80 are configured to receive the subassembly 66 and cooperate to guide subassemblies 66 to their desired position within the housing 52. The internal rails 80 generally allow the subassemblies 66 to be slid into the cavity 56 through the open ends 58 or 60 following the longitudinal axis 74 of the main body 54. That is, the subassemblies 66 and more particularly the carrier 68 are capable of sliding in and out of the housing 52 along one or more surfaces of the rails 80.

The portion of the subassemblies 66 that engages the rails 80 may be a surface of the subassemblies or alternatively one or more posts or mounts that extend outwardly from the subassemblies 66. Furthermore, the reference surfaces for the opposed rails 80 may be positioned in the same plane or they may be positioned in different planes. The configuration generally depends on the configuration of the subassemblies 66. By way of example, in some cases, the subassemblies 66 may have a cross section that is stepped rather than completely planar. In cases such as these, the opposed rails 80 have references surfaces in different planes in order to coincide with the stepped cross section. Moreover, although typically continuous between the ends, each of the rails 80 may be segmented or include removed portions as for example at the ends for placement of the flush mounted end caps.

The width of the rails 80 may be widely varied. For example, they may be one integral piece that extends entirely from one side to the other, or they may be separate pieces with a gap located therebetween (as shown). The position and cross sectional dimensions and shapes of each of the rails may also be widely varied. The size and shape as well as the position of the rails 80 generally depends on the configuration of the sub assemblies 66. The rails 80 may have the same shape and size or they may have different shape and size. In most cases, the size and shape is a balance between keeping them as small as possible (for weight and space requirements) while providing the required reference surface and ample support to the subassemblies 66.

To elaborate, the rails 80 define one or more channels 82 that receive the one or more subassemblies 66. In the illustrated embodiment, the rails 80 along with the main body 54 define a pair of channels, particularly an upper channel 82A and a lower channel 82B. The upper channel 82A receives a first subassembly 66A and the lower channel 8B receives a second subassembly 66B. It should be noted, however, that this is not a limitation and that additional sets of rails 80 may be used to produce additional channels 82. It should also be noted that although only one subassembly 66 is shown for each channel 82 this is not a requirement and that more than one subassembly 66 may be inserted into the same channel 82. Moreover, it should be noted that the subassemblies are not limited to being fully contained with a single channel and that portions of a subs assembly may be positioned in multiple channels. For example, the second subassembly 66B, which is positioned in the lower channel 82B, may include a protruding portion that is positioned through the rails 80 and into the upper channel 82A.

The channels 82 generally include an entry point and a final point. The entry point represents the area of the channel 82 that initially receives the subassemblies 66, i.e., the area proximate the ends of the main body 54. The final point, on the other hand represents the area of the channel 82 that prevents further sliding movement. The final point may for example set the final mount position of the sub assemblies 66 within the housing 52. The final point may for example correspond to an abutment stop. The abutment stop may be integral with the main body 54 or a separate component. By way of example, the abutment stop may correspond to one more posts that are mounted inside the cavity 56 on the inside surface of the main body 54 at a predetermined distance along the longitudinal axis 74.

In order to prevent the subassemblies 66 from sliding once assembled, the interface between the subassemblies 66 and housing 52 may include a locking or securing mechanism.

The locking mechanism 86 generally consists of two parts, a housing side locking feature and a subassembly side locking feature that are cooperatively positioned so that when the subassembly 66 is inserted into the housing 52, the locking features engage with one another thus holding the subassembly 66 in its desired position within the housing 52. In most cases, the locking features are configured to provide quick and easy assembly of the subassembly into the housing without the use of tools. The locking features may correspond to snaps, friction couplings, detents, flexures and/or the like. Alternatively or additionally, the assemblies 66 may be attached to the main body 54 with fasteners or adhesives.

In the illustrated embodiment, the subassemblies 66 each include a flexure tab 88 that engages a recess 90 located on an inner surface of the main body 54. When the subassembly 66 is slid into the housing 52, the tab 88 snaps into the recess 90 thereby securing the subassembly 66 at a predetermined position along the longitudinal axis 74. That is, because the tabs 88 flex, they allow the subassemblies 66 to pass when pushed into the cavity 76. When the subassemblies 66 pass over the recess 90, the tabs 88 resume their natural position thereby trapping the subassemblies 66 in the channel 82 between the locking tab/recess 88/90 and the abutment stop at the end of the channel 82. Using this arrangement, the subassemblies 66 are prevented from sliding out of the channels 82 on their own. In order to remove the subassembly 66, a user simply lifts the tab 88 away from the recess 90 while pulling on the subassembly 66. The recess 90 and abutment stop may cooperate to set the final position of the subassembly 66 in the cavity 56 of the main body 54. For example, the recess and abutment stop may be configured to position the user interface elements 70A directly behind the window opening 62 so that a user has full access to the user interface elements 70A.

In accordance with one embodiment, the main body 54 including the internal rails 80 is formed via an extrusion process. The extrusion process is capable of producing an integral tube without seams, crack, breaks, etc. As is generally well known, extrusion is a shaping process where a continuous work piece is produced by forcing molten or hot material through a shaped orifice, i.e., the extrusion process produces a length of a particular cross sectional shape. The cross sectional shape of the continuous or length of work piece is controlled at least in part on the shaped orifice. As the shaped work piece exits the orifice, it is cooled and thereafter cut to a desired length. As should be appreciated, the extrusion process is a continuous high volume process that produces intricate profiles and that accurately controls work piece dimensions (which can be a necessity for smaller parts). Furthermore, because extrusion has low tooling costs, it is relatively in expensive when compared to other forming or manufacturing processes.

The main body 54 may be formed from a variety of extrudable materials or material combinations including but not limited to metals, metal alloys, plastics, ceramics and/or the like. By way of example, the metals may correspond to aluminum, titanium, steel, copper, etc., and the plastic materials may correspond to polycarbonate, ABS, nylon, etc. The material selected generally depends on many factors including but not limited to strength (tensile), density (lightweight), strength to weight ratio, corrosion resistance, formability, finishing, recyclability, tooling costs, and/or the like. The material selected may also depend on electrical conductivity, thermal conductivity, combustability, toxicity, and/or the like.

In one particular embodiment, the main body 54 including the internal rails 80 is formed from an extruded aluminum tube. Some of the reasons for using aluminum over other materials is that it is light weight and structurally stronger (e.g., it has very good mechanical properties and strength to weight ratio). This is especially important for hand held devices. Other reasons for using aluminum include: reduced tooling costs (e.g., injection moldings can be cost prohibitive), it is easily formable and extruded in a wide variety of shapes including hollow parts, easily machinable thus making it easy to alter the part after the extrusion process, provides a near net shape, offers superior corrosion resistance, it has high scrap value and is routinely reprocessed to generate new extrusions, and it can be finished using a variety of methods including mechanical and chemical prefinishes, anodic coatings, paints and electroplated finishes.

Figure 2:
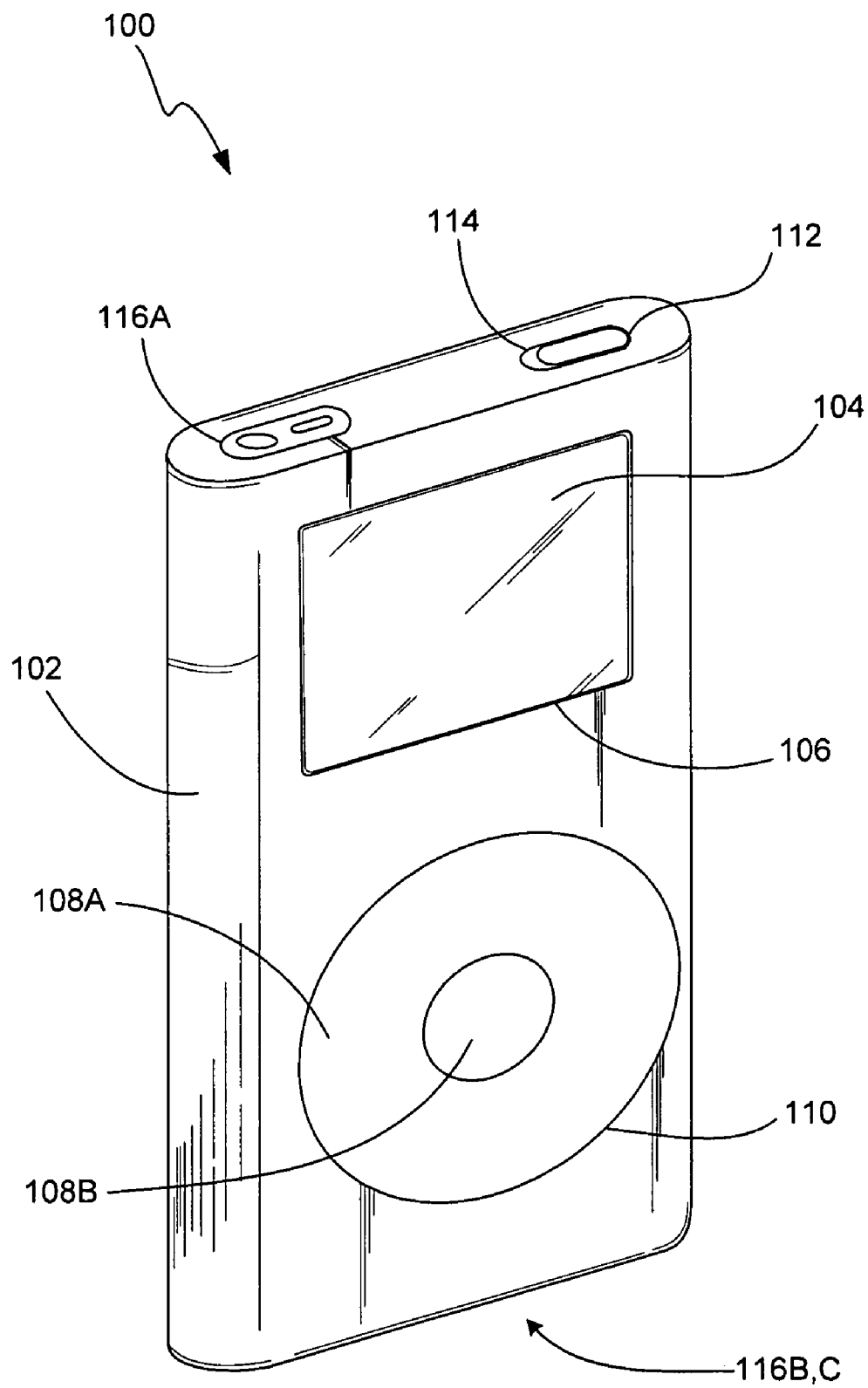
FIG. 2 is a perspective diagram of a handheld computing device, in accordance with one embodiment of the present invention.
Figure 3:
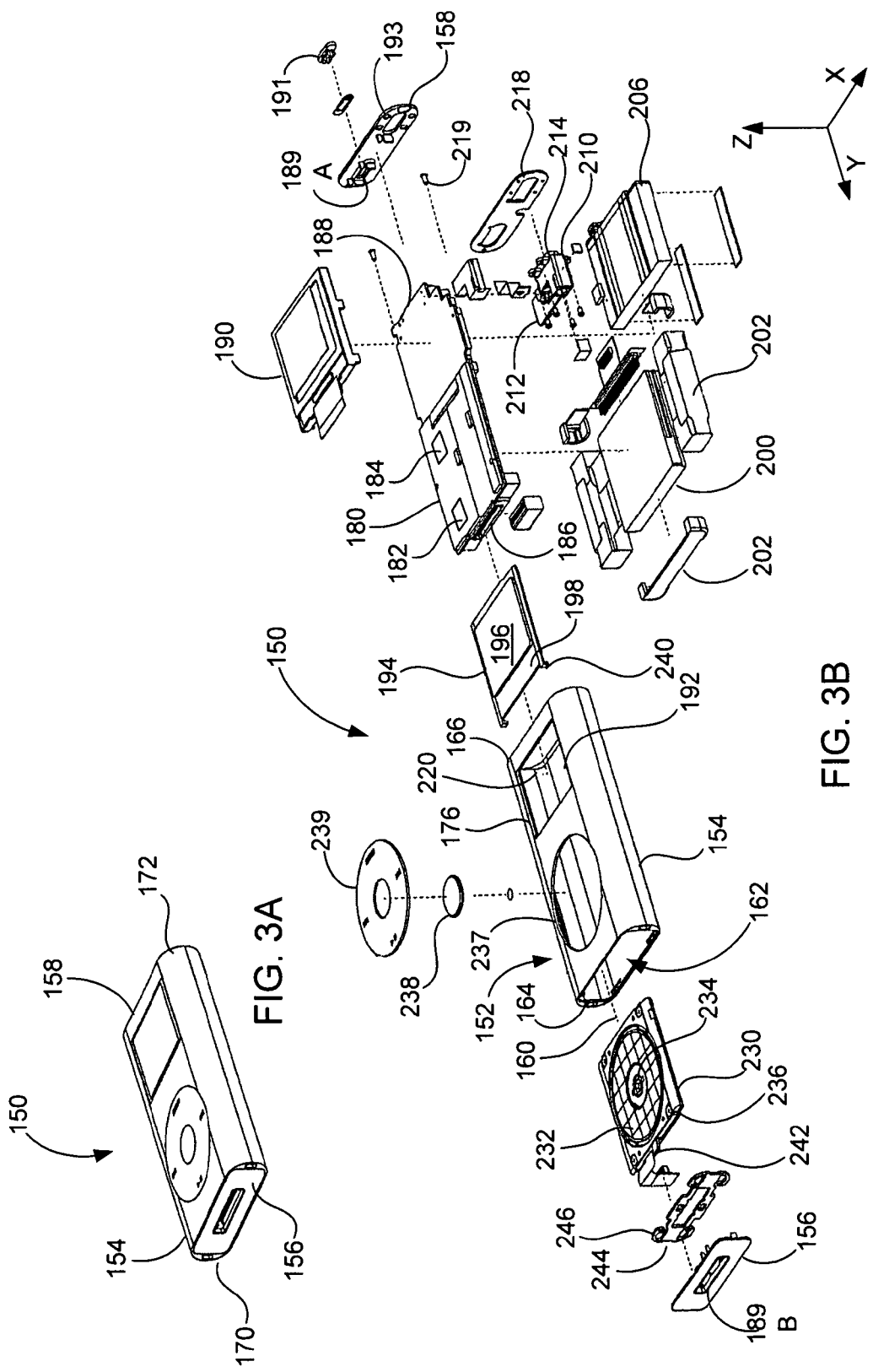
FIG. 3A is a diagram of an assembled hand held computing device, in accordance with one embodiment of the present invention.
FIG. 3B is a diagram of the hand held computing device of FIG. 3A in its unassembled form, in accordance with one embodiment of the present invention.

FIG. 2 is a perspective diagram of a handheld computing device 100, in accordance with one embodiment of the present invention. By way of example, the computing device 100 may generally correspond to the device 50 shown and described in FIG. 1. The computing device 100 is capable of processing data and more particularly media such as audio, video, images, etc. By way of example, the computing device 100 may generally correspond to a music player, game player, video player, camera, cell phone, personal digital assistant (PDA), and/or the like. With regards to being handheld, the computing device 100 can be operated solely by the user's hand(s), i.e., no reference surface such as a desktop is needed. In some cases, the handheld device is sized for placement into a pocket of the user. By being pocket sized, the user does not have to directly carry the device and therefore the device can be taken almost anywhere the user travels (e.g., the user is not limited by carrying a large, bulky and heavy device). In the illustrated embodiment, the computing device 100 is a pocket sized hand held music player that allows a user to store a large collection of music. By way of example, the music player may correspond to the iPod series MP3 players, and more particularly the iPod mini manufactured by Apple Computer of Cupertino, Calif.

As shown, the computing device 100 includes a housing 102 that encloses and supports internally various electrical components (including integrated circuit chips and other circuitry) to provide computing operations for the device. The integrated circuit chips and other circuitry may include a microprocessor, hard drive, Read-Only Memory (ROM), Random-Access Memory (RAM), a battery, a circuit board, and various input/output (I/O) support circuitry. In addition to the above, the housing 102 may also define the shape or form of the device 100. In this particular embodiment, the housing 102 extends longitudinally and has a pill like cross section. The size and shape of the housing 102 is preferably dimensioned to fit comfortably within a user's hand. In one particular embodiment, the housing is formed from an extruded material such as aluminum thereby providing a seamless look along the length of the device 100. That is, unlike conventional housings, the housing 102, particularly the main body, does not include any breaks between the top and bottom ends thereby making it stronger and more aesthetically pleasing.

The computing device 100 also includes a display screen 104. The display screen 104, which is assembled within the housing 102 and which is visible through an opening 106 in the housing 102, is used to display a graphical user interface (GUI) as well as other information to the user (e.g., text, objects, graphics). By way of example, the display screen 104 may be a liquid crystal display (LCD). In some cases, the housing 102 may include a window, which is positioned in the opening in front of the display in order to protect the display from damage. The window is typically formed from a clear material such as clear polycarbonate plastic.

The computing device 100 also includes one or more input devices 108 configured to transfer data from the outside world into the computing device 100. The input devices 108 may for example be used to perform tracking/scrolling, to make selections or to issue commands in the computing device 100. By way of example, the input devices 108 may correspond to keypads, joysticks, touch screens, touch pads, track balls, wheels, buttons, switches, and/or the like. In the illustrated embodiment, the computing device 100 includes a touch pad 108A and one or more buttons 108B, which are assembled within the housing 102 and which are accessible through a second opening 110 in the housing 102.

The touch pad 108A generally consists of a touchable outer surface 111 for receiving a finger for manipulation on the touch pad 100A. Although not shown, beneath the touchable outer surface 111 is a sensor arrangement. The sensor arrangement includes a plurality of sensors that are configured to activate as the finger passes over them. In the simplest case, an electrical signal is produced each time the finger passes a sensor. The number of signals in a given time frame may indicate location, direction, speed and acceleration of the finger on the touch pad, i.e., the more signals, the more the user moved his or her finger. In most cases, the signals are monitored by an electronic interface that converts the number, combination and frequency of the signals into location, direction, speed and acceleration information. This information may then be used by the device 100 to perform the desired control function on the display screen 104.

The position of the touch pad 108A relative to the housing 102 may be widely varied. For example, the touch pad 108A may be placed at any external surface (e.g., top, side, front, or back) of the housing 102 that is accessible to a user during manipulation of the device 100. In most cases, the touch sensitive surface 101 of the touch pad 108A is completely exposed to the user. In the illustrated embodiment, the touch pad 108A is located in a lower, front area of the housing 102. Furthermore, the touch pad 108A may be recessed below, level with, or extend above the surface of the housing 102. In the illustrated embodiment, the touch sensitive surface 111 of the touch pad 108A is substantially flush with the external surface of the housing 102.

The shape of the touch pad 108A may also be widely varied. For example, the touch pad 108A may be circular, rectangular, square, oval, triangular, and the like. In the illustrated embodiment, the touch pad 108A is circular. Circular touch pads allow a user to continuously swirl a finger in a free manner, i.e., the finger can be rotated through 360 degrees of rotation without stopping. Furthermore, the user can rotate his or her finger tangentially from all sides thus giving it more range of finger positions. For example, when the device 100 is being held, a left handed user may choose to use one portion of the touch pad 108A while a right handed user may choose to use another portion of the touch pad 108A. More particularly, the touch pad is annular, i.e., shaped like or forming a ring. When annular, the inner and outer perimeter of the shaped touch pad defines the working boundary of the touch pad.

The buttons 108B are configured to provide one or more dedicated control functions for making selections or issuing commands associated with operating the device 100. By way of example, in the case of a music player, the button functions may be associated with opening a menu, playing a song, fast forwarding a song, seeking through a menu and the like. In most cases, the button functions are implemented via a mechanical clicking action although they may also be associated with touch sensing similar to the touch pad 108A. The position of the buttons 108B relative to the touch pad 108A may be widely varied. For example, they may be next to one another (center or peripheral), spaced apart or integrated into a single unit. Several touch pad/button arrangements, which may be used in the device 100, are described in greater detail in pending patent application Ser. Nos.: 10/643,256, 10/188,182, 10/722,948, which are all herein incorporated by reference.

The computing device 100 also includes one or more switches 112 including power switches, hold switches, and the like. The power switch is configured to turn the device 100 on and off, and the hold switch is configured to activate or deactivate the touch pad 108A and/or buttons 108B. This is generally done to prevent unwanted commands by the touch pad 108A and/or buttons 108B, as for example, when the device 100 is stored inside a user's pocket. Like the touch pad 108A and buttons 108B, the switches 112 are accessible through a third opening 114 in the housing 102.

The device 100 may also include one or more connectors 116 for transferring data and/or power to and from the device 100. In the illustrated embodiment, the device 100 includes an audio jack 116A, a data port 116B and a power port 116C. The audio jack 116A allows audio information to be outputted from the device 100. The data port 116B allows data to be transmitted and received to and from a host device such as a general purpose computer (e.g., desktop computer, portable computer). The data port 116B may be used to upload or down load audio, video and other image data to and from the device 100. For example, the data port 116B may be used to download songs and play lists, audio books, ebooks, photos, and the like into the storage mechanism of the computing device 100. The power port 116C, on the other hand, allows power to be delivered to the computing device 100. In some cases, the data port 116B may serve as both a data and power port thus replacing a dedicated power port 116C. A data port such as this is described in greater detail in pending U.S. patent application Ser. No. 10/423,490, which is herein incorporated by reference.

FIGS. 3A and 3B are diagrams of a hand held computing device 150, in accordance with one embodiment of the present invention. FIG. 3A is perspective diagram showing the computing device 150 in its assembled form, while FIG. 3B is an exploded perspective diagram showing the computing device 150 in its unassembled form. The computing device 150 may generally correspond to the computing device 100 shown and described in FIG. 2.

The computing device 150 includes a housing 152, which serves to support the internal components of the computing device 150 in their assembled position within the device 150. The housing 152 includes several components including a seamless enclosure 154, a bottom end cap 156 and a top end cap 158. The seamless enclosure 154 extends along a longitudinal axis 160, and includes an internal lumen 162 which is sized and dimension for receipt of the internal components of the computing device 150 through a first open end 164 and a second open end 166 opposite the first open end 164. The end caps 156 and 158 cover the open ends 164 and 166 of the seamless enclosure 154 in order to provide a fully contained housing 152. Although the end caps 156 and 158 can be applied in a variety or ways, in this particular embodiment, each of the end caps 156 and 158 includes a shape that coincides with the internal shape of the seamless enclosure 154 such that they may be inserted into the open ends, i.e., the outer periphery of the end caps 156, 158 matches the inner periphery of the lumen 162. Furthermore, the end caps 156 and 158 are positioned to be flush with the bottom 170 and top surfaces 172 of the seamless enclosure 154 thereby forming a housing 152 with a substantially uniform appearance.

In order to help guide at least a portion of the internal components to their desired position within the seamless enclosure 154, the seam less enclosure 154 includes an internal rail system 176 including a pair of rails 177 that protrude out the inner sides of the seamless enclosure 154. The two rails 177, which are similarly shaped, are placed in an opposed relationship directly across from one another. The rails 177 provide reference surfaces for receiving and supporting some portion of the internal components. The portion of the internal components that engages the rails 177 is typically an edge of the internal components. The internal rail system 176 is integrally formed with the seamless enclosure 154. By integral, it is meant that the seamless enclosure 154 and the rail system 176 are formed from a single piece of material.

In fact, the seamless enclosure 154 along with integrally formed internal rails 176 are preferably formed from an extrusion process. The extrusion process produces the desired cross section in a continuous tube, which can be cut to form a seamless enclosure 154 including the internal rails 176 with a desired length. That is, the seamless enclosure 154 including the internal rails 176 is formed from an elongated continuous extruded tube that has been cut to a desired length. As should be appreciated, the features of the internal rail 176 are extruded along with the seamless enclosure 154 thereby forming rails that have the same length as the seamless enclosure, i.e., the extrusion process produces rails that extend from the top to the bottom end of the seamless enclosure.

Although the extrusion process allows for a variety of materials, in this particular embodiment, the continuous tube is formed from a metal material and more particularly from aluminum (or some other material that has similar properties to aluminum). The end caps 156 and 158, on the other hand, are formed from a plastic material such as ABS using a manufacturing process such as injection molding.

Moving along, the internal components of the computing device 150 include a printed circuit board 180 that contains various integrated circuit chips and other circuitry that provide computing operations for the computing device 150. The printed circuit board 180 may for example include a microprocessor 182, memory 184, a data port 186, and a switch 188. Although not shown, the printed circuit board 180 may also contain interconnecting circuitry and related components that help to operatively couple the various internal components together. In order to provide access to some of these components, the top end cap 158 includes an opening 189A for the switch 188 and the bottom end cap 156 includes an opening 189B for the data port 186. As shown, the switch 188 may include a switch cap 191 that is snapped onto the switch 188 after the top end cap 158 is finally assembled.

The internal components of the computing device 150 also include a display 190 such as for example a liquid crystal display. The liquid crystal display 190 is mounted on the front of the printed circuit board 180. The LCD 190 may be mounted to the PCB 180 using a variety of techniques. By way of example, the LCD 190 may include locking tabs that snap onto the printed circuit board 180 in order to secure the LCD 190 thereto. Alternatively, the LCD 190 may be a stand alone assembly, i.e., floating rather than mounted to the PCB 180. In either case, the LCD 190 is operatively coupled to the printed circuit board 180 and its various components. This may for example be accomplished through a flex circuit connector that couples to a connector located on the printed circuit board 180.

In order to provide visible access to the display 190, the seamless enclosure 154 includes an access opening 192 having a shape that coincides with the shape of the viewing area of the LCD 190. The access opening 192 may be formed by processes such as machining, drilling, cutting, punching and/ or the like. In most cases, a clear window 194 (typically formed from plastic) is positioned in the access opening 192 in front of the LCD 190 in order to protect the LCD 190 from damage. In fact, when assembled, the window 194 may be considered a portion of the housing 152. The window 194 may be attached to the seamless enclosure 154 using a variety of techniques including but not limited to fasteners, snaps, adhesives, etc. In the illustrated embodiment, the window 194 includes a raised section 196 that sits in the opening 192 and that is either substantially flush or recessed with the outer surface of the seamless enclosure 154 so that it does not protrude above the outer surface and a flange section 198 having an adhesive layer that secures the window 194 to the inner surface of the seamless enclosure 154. By having the window flush or recessed, scratching of the window is substantially avoided.

The internal components of the computing device 150 also include a hard drive 200. The hard drive 200, which is located at the rear of the printed circuit board 180, is operatively coupled to the printed circuit board 180 and its various components. This may for example be accomplished through a flex circuit connector that couples to a connector located on the printed circuit board 180. The hard drive 200 may be mounted (as shown) or it may be free floating relative to the PCB 180. Although not a requirement, the hard drive 200 may be surrounded by a plurality of bumpers 202 that serve to protect the hard drive 200 when assembled, i.e., the bumpers 202 help to prevent shocks to the hard drive 200. They also may provide a surface that helps retain the hard drive 200 within the housing 152 (e.g., friction, compliance, etc.). As should be appreciated, the hard drive gives the device massive storage capacity unlike flash based devices. By way of example, the hard drive may have capacities of 5 GB, 10 GB, 15 GB, 20 GB and so on. To cite an example, when the device is used as a music player, a 20 GB hard drive can store up to 4000 songs or about 266 hours of music.

The internal components of the computing device 150 also include a battery 206. The battery 206, which is located at the rear of the printed circuit board 180, is operatively coupled to the printed circuit board 180 and its various components. This may for example be accomplished through a connector that couples to a connector located on the printed circuit board 180. In some cases, the battery may be attached to the backside of the PCB using for example an adhesive such as double sided tape. In other cases, the battery 206 may be free floating. By way of example, the battery may correspond to a rechargeable lithium polymer battery or a lithium ion prismatic cell. These types of batteries are capable of offering about 10 hours of continuous playtime to the device 150.

The internal components of the computing device 150 also include an audio subassembly 210. The audio subassembly 210, which is located at the top of the printed circuit board 180, is operatively coupled to the printed circuit board 180 and its various components. The audio subassembly 210 includes at least a small printed circuit board 212 and an audio jack 214. The audio subassembly may also contain various circuit components and interconnecting circuitry, which are attached to the PCB 212. Although the audio subassembly may be free floating, in the illustrated embodiment, the audio subassembly 210 is mechanically coupled to the PCB 180 so that the PCB 180 and audio subassembly 210 operate as a single unit (i.e., form a single structure). By way of example, they may be coupled together using fasteners, adhesives or snaps.

In one particular embodiment, the audio subassembly 210 is both operatively and mechanically coupled to the main printed circuit board 180 and its various components through a connector, which is located on the audio printed circuit board 212, and which couples to a connector located on the main printed circuit board 180. The coupling between the connectors may include a friction element or mechanical detent that substantially secures the audio subassembly 210 to the printed circuit board 180. In order to provide access to the audio jack 214 audio subassembly 210, the top end cap 158 includes an opening 193 having a shape that coincides with the shape of the audio jack 214. In most cases, the housing of the audio jack 214 is substantially flush with the outer surface of the top end cap 158.

During assembly and referring to the top end of the seamless enclosure 154, the integrated system comprising, the PCB 180, LCD 190, hard drive 200, battery 206 and audio subassembly 210 is inserted into the lumen 156 of the seamless enclosure 154 as a single unit. The printed circuit board 180 essentially acts as a carrier for placing these components inside the housing 152. During assembly, the PCB 180 is inserted in the direction of the y axis into the space provided by a portion of the side and bottom surfaces of the seamless enclosure 154 as well as the bottom surface of the internal rail system 176. This space may be referred to as a channel. During insertion, a top surface of the PCB 180 slides along the bottom surface of the internal rail system 176 within the space. As should be appreciated, the side walls, bottom surface and rails help constrain the PCB 180 within the housing 152 during and after insertion. The PCB 180 is typically slid into the seamless enclosure 154 to a depth (y) that places the LCD 190 directly behind the access opening 192. Furthermore, the internal rail system 176 helps locate the PCB 180 and thus the LCD 190 in the direction of the z axis while the side walls of the seamless enclosure 154 help locate the PCB 180 and thus the LCD 190 in the direction of the x axis.

In order to ensure proper positioning as well as to help secure the integrated system in place, a top plate 218 may be provided that prevents further sliding and sets the final position of the integrated system. The top plate 218 may be attached to the main PCB 180 or the PCB 212 of the audio subassembly 210. The top plate 218 may be attached using a variety of techniques including but not limited to fasteners, adhesives, snaps and/or the like. In the illustrated embodiment, the top plate 218 is attached to the PCB 212 of the audio subassembly 210. When the integrated system is slid into the lumen 162, the bottom surface of the top plate 218 abuts a recessed area 220 formed in the top surface of the seamless enclosure 154. The recessed area 220 may for example be formed by machining a portion of the top surface of the seamless enclosure 154 (including the rails 177). Once positioned against the recessed area 220, the top plate 218 is attached to the seamless enclosure 154 using fasteners such as screws 219.

The depth of the top plate 218 generally depends on the desired position of the top end cap 158. In order to produce a flush top surface, the top plate 218 is typically positioned to a depth corresponding to the thickness of the top plate 218 and the top end cap 158. Once the top plate 218 is secured, the top end cap 158 may be attached thereto. The top end cap 158 may be attached to the top plate 218 using fasteners, snaps, adhesives, and/or the like. In order to make assembly easier and to prevent the undesirable look of fasteners, the top plate 218 may include several retaining features for receiving tabs located on the inside surface of the top end cap 158. When the top end cap 158 engages the top plate 218, the tabs are inserted into the retaining features thereby securing the top end cap 158 to the top plate 218 (via a snapping action).

In one embodiment, the audio subassembly 210 includes a positioning adjustment portion (not shown) configured to provide position relief when attaching the top plate 218 to the seamless enclosure 154. That is, the adjustment portion allows some degree of tolerance or play so that the top plate 218, which is connected to the integrated system via the audio subassembly 210, can be precisely placed relative to the seamless enclosure 154. The adjustment portion may be separate component or be integrally formed with the PCB 212. When separate, the adjustment portion may be or include a compliant member, a flexure, a mechanical mechanism and/or the like. When integral, the adjustment portion may be a flexure formed from the PCB 212. In particular, the adjustment portion may be a tab that has been partially cut away from the PCB 212 thereby enabling it to flex or bend.

The internal components of the computing device 150 also include an input assembly 230. The input assembly 230 may be widely varied. The input assembly generally depends on the type of device. In the illustrated embodiment, the input assembly 230 includes a touch pad 232 and a center switch 234 positioned on a frame 236. The switch 234 is a portion of a button, which may be actuated by a user to perform actions in the device 150. Although the input device 230 is structurally separated from the printed circuit board 180, it is operatively coupled to the printed circuit board 180 and its various components. This may be accomplished for example through a flex circuit connector that couples to a connector located on the printed circuit board 180. This connection is typically made after the PCB 180 and input device 230 have been inserted into the seamless enclosure 154.

In some cases, the touch pad 232 is capable of moving relative to the frame 236 in order to actuate additional mechanical switches housed within the frame 236. Each of the switches represents a button, which may be actuated by a user. By way of example, the input assembly 230 may correspond to any of those input devices disclosed in U.S. patent application Ser. No. 10/643,256, which is herein incorporated by reference.

In order to provide user access to the input assembly 230, the seamless enclosure 154 includes an access opening 237 having a shape that coincides with the shape of the touch pad 232. Like the first access opening 192, the second access opening 237 may be formed from processes (individually or in combination) such as machining, drilling, cutting, punching and/or the like. In most cases, a button cap 238 and cover 239 is positioned in the access opening 237 in front of the touch pad 232 and switch 234 in order to seal the device 150 and protect the touch pad 232 and switch 234 from damage. The cover 239 is generally sized for placement in the access opening 237 and to provide a surface that is substantially flush with the outer surface of the seamless enclosure 154. The cover 239 is typically attached to the touch pad 232 using an adhesive. The button cap 238 typically includes a flange potion that is trapped between the cover 239 and the input assembly 230 thereby securing the button cap 238 to the input assembly 230.

During assembly and referring to the bottom end of the seamless enclosure 154, the input assembly 230 is inserted into the lumen 156 of the seamless enclosure 154. The frame 236 acts as a carrier for placing the input assembly 230 inside the housing 152. During assembly, the input assembly 230 is inserted in the direction of the y axis into the space provided by a portion of the side and top surfaces of the seamless enclosure 154 as well as the top surface of the internal rail system 176. This space may be referred to as a channel. During insertion, a bottom surface of the frame 236 slides along the top surface of the internal rail system 176 within the space. As should be appreciated, the side walls, top surface and rails help constrain the input assembly 230 within the housing 152 during and after insertion. The input assembly 230 is typically slid into the seamless enclosure 154 to a depth (y) that places the touch pad 232 directly behind the access opening 237. The depth may be set by posts located inside the seamless enclosure. In the illustrated embodiment, the window 193 includes a pair of abutment stops 240 that prevents further sliding and sets the final position of the input assembly 230 in the y direction. Furthermore, the internal rail system 176 helps locate the touch pad 232 and switch 234 in the direction of the z axis while the side walls of the seamless enclosure 154 help locate the touch pad 232 and switch 234 in the direction of the x axis.

In order to ensure proper positioning as well as to help secure the input assembly 230 in place, the input assembly 230 may include a locking feature that locks the input assembly 230 in place when the input assembly 230 is finally inserted into the seamless enclosure. In one embodiment, the locking feature is in the form of a tab 242 that snaps into a recess located on the inner surface of the seamless enclosure 154. The recess may be formed by machining a groove in the inner surface of the seamless enclosure 154 at a position that coincides with the input assembly 230 when it is finally inserted.

Like the top end, the bottom end may include a structural plate, i.e., bottom plate 244. The bottom plate 244 is configured to act as a reference support surface for the bottom end cap 156. It may also act as a reference surface for the input assembly 230 or the main system assembly. The bottom plate 244 may be connected to the seamless enclosure 154 and/or the input assembly 230. The bottom plate 244 may be attached using a variety of techniques including but not limited to fasteners, adhesives, snaps and/or the like. By way of example, the bottom plate 244 may be connected in a manner similar to the top plate (attached to the input assembly and inserted into a recess).

Alternatively, as shown in the Figure, the bottom plate 244 may include retaining features 246 that snap into recesses formed in the inner surface of the seamless enclosure 154 thereby mechanically securing the bottom plate 244 to the seamless enclosure 154. The recesses may be formed by machining grooves in the inner surface of the seamless enclosure 154 at a position that coincides with the retaining features 246 when the bottom plate 244 is inserted in the seamless enclosure 154. During assembly, the retaining features 246 are flexed inwardly, and the bottom plate 244 is placed inside the seamless enclosure 154. Once the bottom plate 244 is correctly positioned next to the recesses, the retaining features 246 are unflexed outwardly thereby causing them to be outwardly extended into the recesses, i.e., the retaining features 246 are received by the recesses. A tool may be required to flex the retaining features in a manner analogous to retaining rings. Unlike retaining rings, however, the bottom plate is not circular, and spans the inside of the enclosure to support internal and external parts. Furthermore, the bottom plate is fixed in place and cannot rotate as circular retaining rings thus providing a reference surface in more than just the y direction, i.e., the bottom plate provides a reference surface in the x, y and z directions. This enables the bottom plate to fixedly support the end cap.

The depth of the bottom plate 244 generally depends on the desired position of the bottom end cap 156. In order to produce a flush bottom surface, the bottom plate 244 is typically positioned to a depth corresponding to the thickness of the bottom plate 244 and the bottom end cap 156. Once the bottom plate 244 is secured, the bottom end cap 156 may be attached thereto. The bottom end cap 156 may be attached to the bottom plate using fasteners, snaps, adhesives, and/or the like. In order to make assembly easier and to prevent the undesirable look of fasteners, the bottom plate 244 may include several retaining features for receiving tabs located on the inside surface of the bottom end cap 156. When the bottom end cap 156 engages the bottom plate 244, the tabs are inserted into the retaining features thereby securing the bottom end cap 156 to the bottom plate (via a snapping action).

The bottom plate may be formed from a variety of materials such as metals and plastics. The material that is selected typically offers a balance between resistance to deformation so as to provide a structural surface and bendability so that the flexure arms can be flexed during installation. In the illustrated embodiment, the bottom plate is formed from stainless steel, and more particularly high hardness stainless steel.

Figure 4:
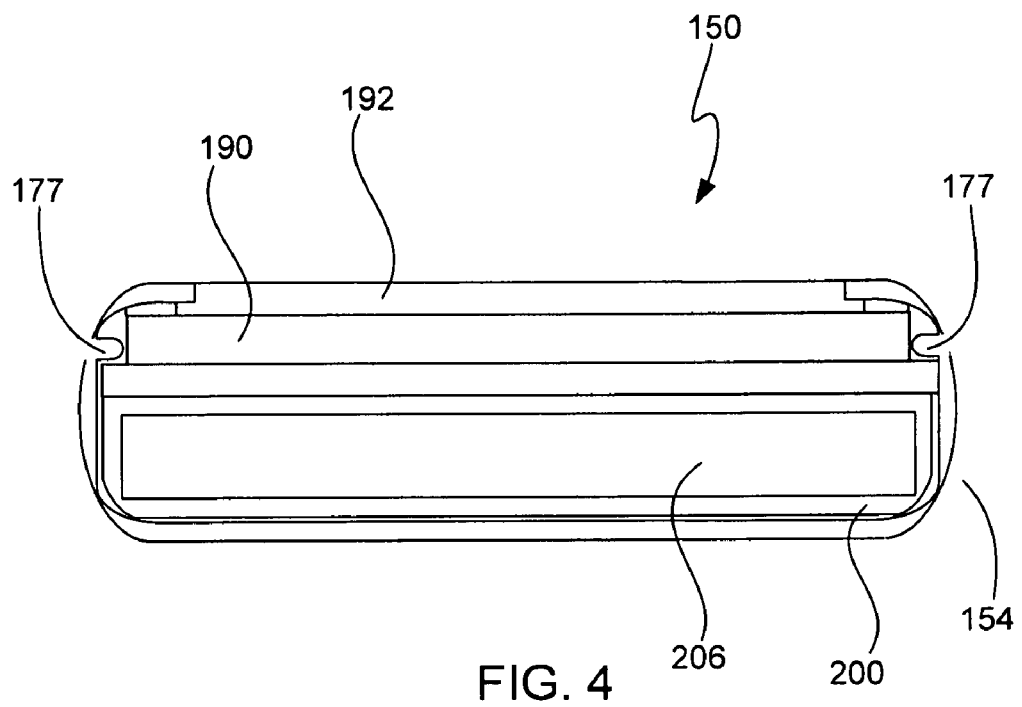
FIG. 4 is top view diagram, in cross section, of an assembled hand held computing device, in accordance with one embodiment of the present invention.

FIG. 4, which is top view, in cross section of the assembled device 150, shows the position of the various components of the integrated system inside the housing 152 and more particularly the seamless enclosure 154. As shown, the top surface at the edge of the printed circuit board 180 abuts the bottom surface of the rails 177. Furthermore, the battery 206 and hard drive 202 are contained within the lower channel formed by the rails, sides and back surface of the seamless enclosure 154. In most cases, there is a snug fit between these components and the surrounding portions of the seamless enclosure 154 so as to help hold the integrated system in place. Moreover, the LCD 190 protrudes above the rails 177 through a gap formed between the rails 177 so that it is positioned directly underneath the window 194. In some cases, the gap may be dimensioned to form a snug fit between the LCD and rails to better align the LCD with the opening, i.e., the rails provide a reference surface for the LCD in the x direction.

Figure 5:
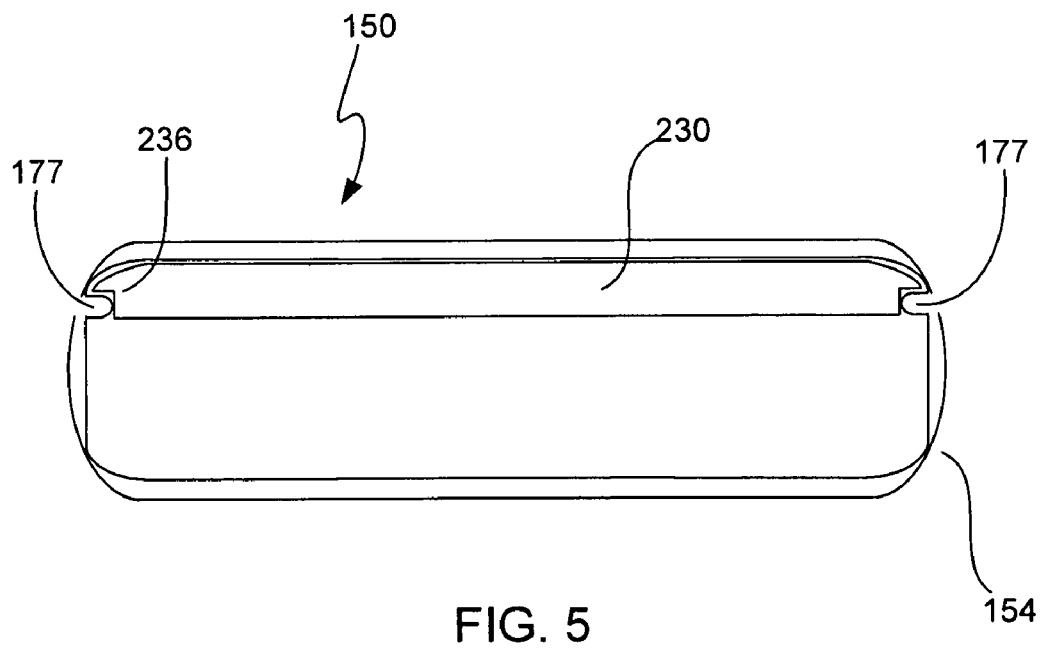
FIG. 5 is bottom view diagram, in cross section, of the assembled hand held computing device, in accordance with one embodiment of the present invention.

FIG. 5, which is bottom view, in cross section of the assembled device 150, shows the position of the input assembly 230 inside the housing 152, and more particularly the seamless enclosure 154. As shown, the bottom surface at the edge of the frame 236 abuts the top surface of the rails 177. Furthermore, most of the input assembly 230 is contained within the upper channel formed by the rails, sides and surface of the seamless enclosure 154. In most cases, the input assembly 230 is sized and dimensioned to fit snuggly inside the upper channel. A small portion of the frame (or other component of the input assembly 230) may be positioned within the gap formed between the two rails 177.

Figure 6A:
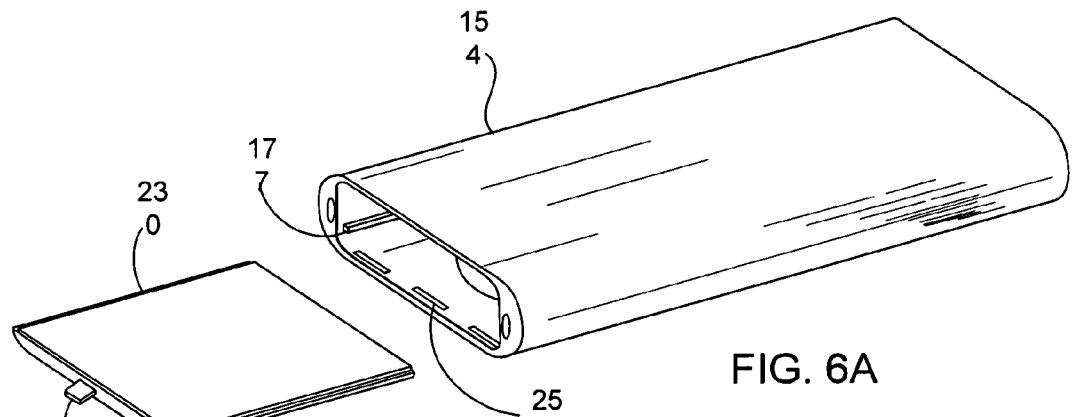
FIGS. 6A-6C show the insertion and mounting of an input assembly inside a seamless enclosure, in accordance with one embodiment of the present invention.
Figure 6B:
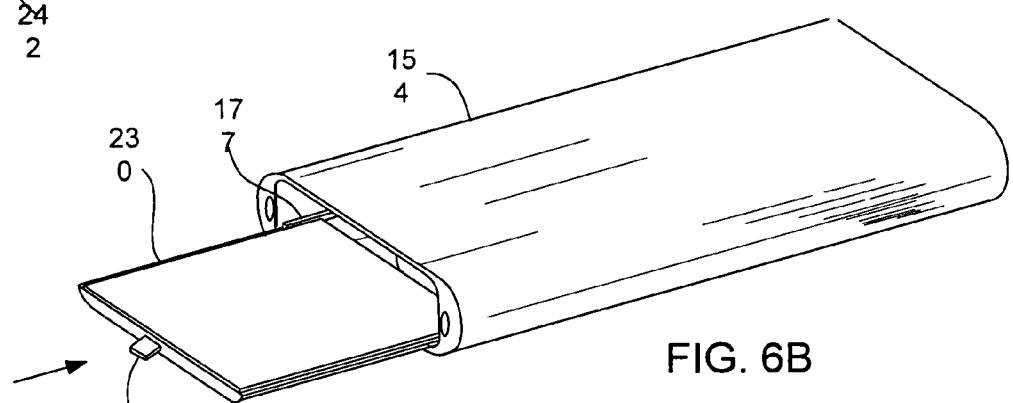
Figure 6C:
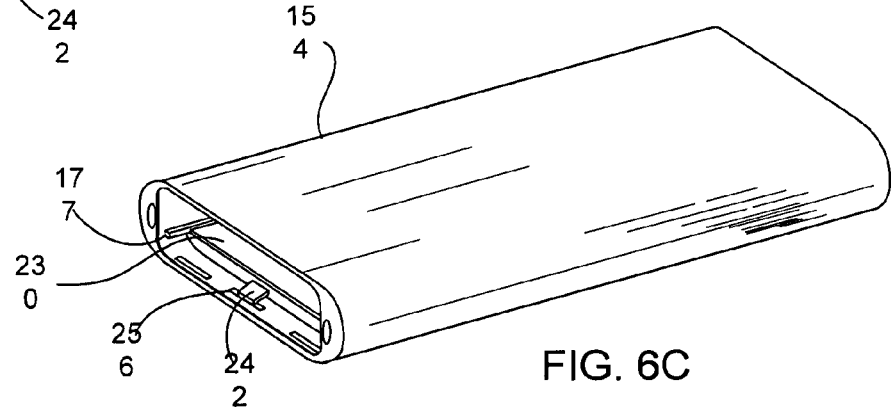

FIGS. 6A-6C show the insertion and mounting of the input assembly 230 inside the seamless enclosure 154. As shown in FIGS. 6A and 6B, the input assembly 230 is inserted into the bottom end of the seamless enclosure 154. In particular, the front edge of the input assembly 230 is placed within the upper channel against the rails 177, and the input assembly 230 is slid along the rails 177 into the seamless enclosure 154. As shown in FIG. 6C, when the input assembly 230 nears its final position in the y direction, the tab 242 on the rear of the input assembly 230 snaps into a recess 256 located on the inner top surface of the seamless enclosure 154 thereby securing the input assembly 230 between this point and the abutment stops 240 located on the window 194. The positions of the abutment stop 240 and recess 256 are preferably positioned such that the tab 242 engages the recess 256 as the input assembly 230 presses against the abutment stop 240. This particular arrangement helps prevent any subsequent movement of the input assembly 230, i.e., locks it into place (in the y direction).

Figure 7B:
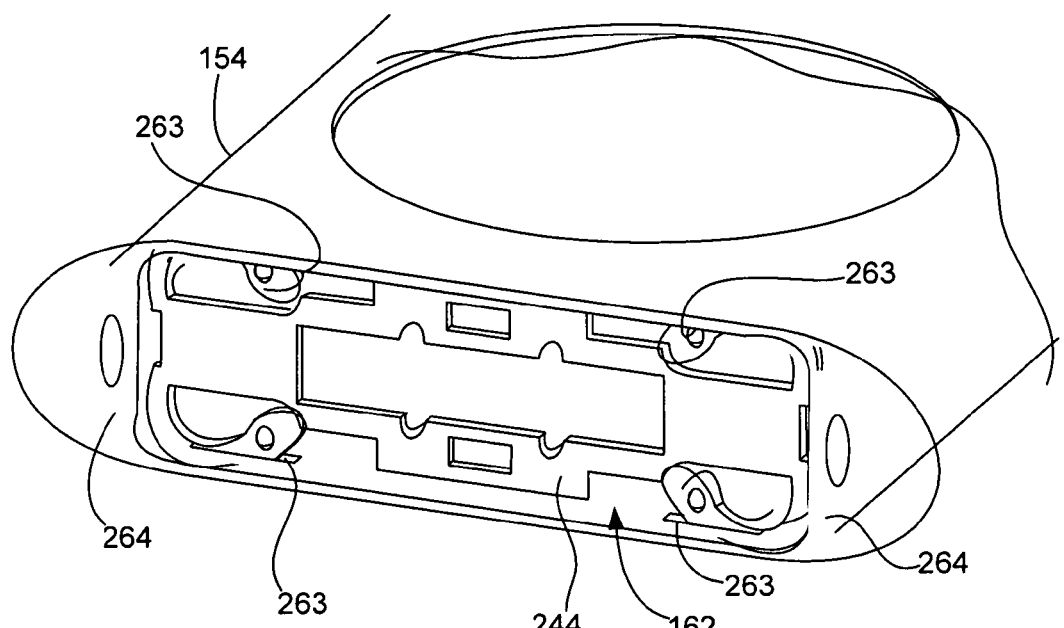
FIGS. 7A and 7B show a bottom plate in its unassembled and assembled positions, in accordance with one embodiment of the present invention.
Figure 7A:
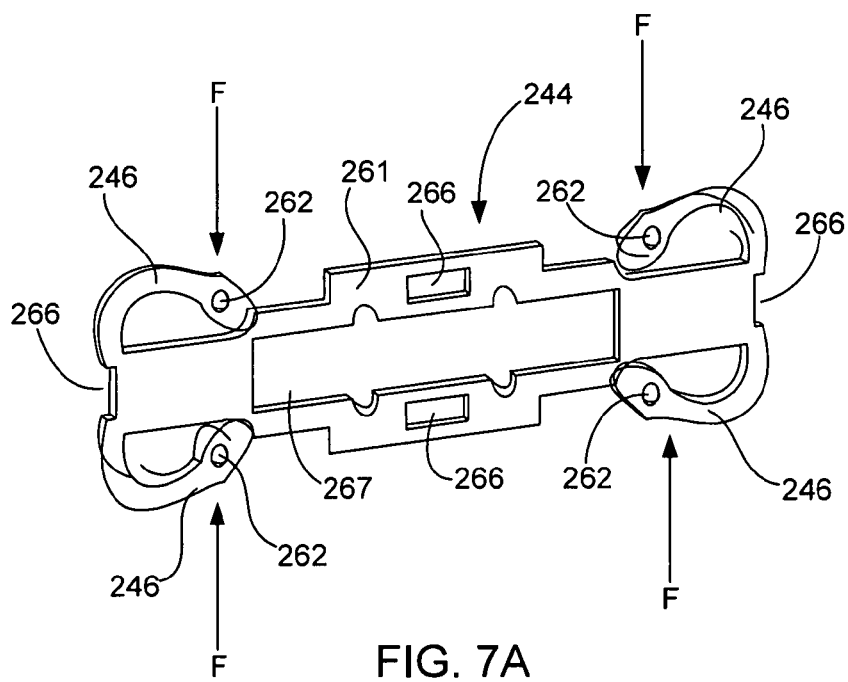

FIGS. 7A and 7B show the bottom plate 244 in its unassembled and assembled positions. The bottom plate 244 includes a body 261 and a plurality of flexure arms 246. The body 261 is typically configured to fill the available space between the opposing sets of retaining arms 256 so as to produce a more rigid structure for supporting the various components enclosed within or attached to the enclosure 154. The flexure arms 246, which extend from the body 261, are configured to bend in towards the body 261 when a force F is applied to the flexure arms 246. In some cases, the interface between the body and the flexure arms includes a radius. The radius may be adjusted to tune the stiffness of the flexure arms. The force F may for example be provided by a pinching tool that engages holes 262 located in each of the flexure arms 246.

Both the body and the arms are configured to cooperate to form the shape of the bottom plate. The shape may be widely varied although the shape is generally configured to be non circular so as to provide a better reference surface (e.g., substantially rectangular). In fact, the shape may coincide with the shape of the lumen found in the enclosure.

The bottom plate 244 may be formed from a variety of structural materials including metals and plastics. By way of example, the bottom plate 244 may be formed from stamping a sheet of metal (e.g., steel) or from molding a piece of plastic.

As shown in FIG. 7B, the bottom plate 244 is positioned inside the lumen 162 of the seamless enclosure 154. In particular, the flexure arms 246 are retained within slots 263 located on the inside surface of the seamless enclosure 154. In fact, the flexure arms may include outward protrusions that provide a better interface between the flexure arms and the slots. The bottom plate 244, which is designed to receive the bottom end cap 156, is positioned at the end of the seamless enclosure 154 so as to produce a reference support surface for the bottom end cap 156. In essence, the bottom plate 244 when retained acts as an extension of the seamless enclosure 154. The depth of the bottom plate 244 is typically configured to place the outer surface of the bottom end cap 244 substantially flush with the bottom surface 264 of the seamless enclosure 154. The bottom plate 244 may include various features 266 for receiving locking tabs located on the bottom end cap 156. As should be appreciated, the features may be openings or voids that receive snaps on the bottom of the end cap, i.e., the snaps snap into the openings thereby securing the bottom end cap to the bottom plate. The bottom plate 244 may also include an opening 267, which provides a clearance for the connector 186.

Figure 8A:
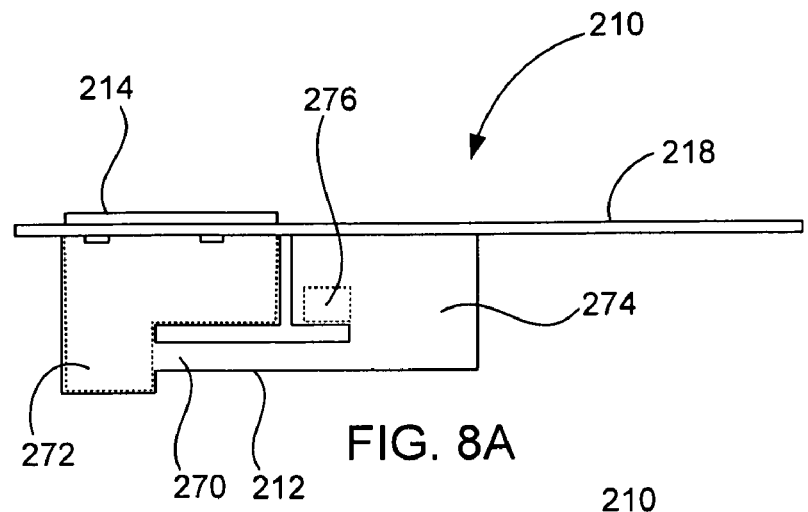
FIGS. 8A-8C are diagrams illustrating the audio subassembly in accordance with one embodiment of the present invention.
Figure 8B:
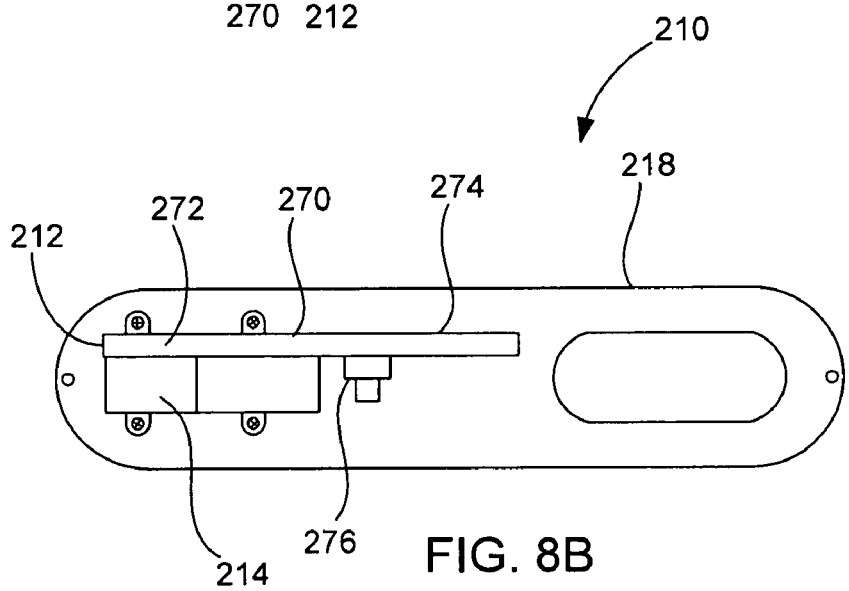
Figure 8C:
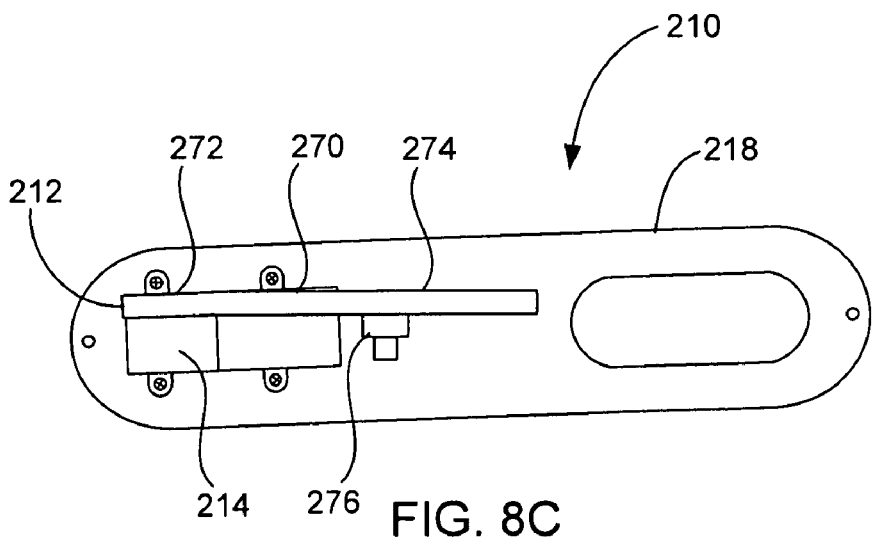
Figure 9A:
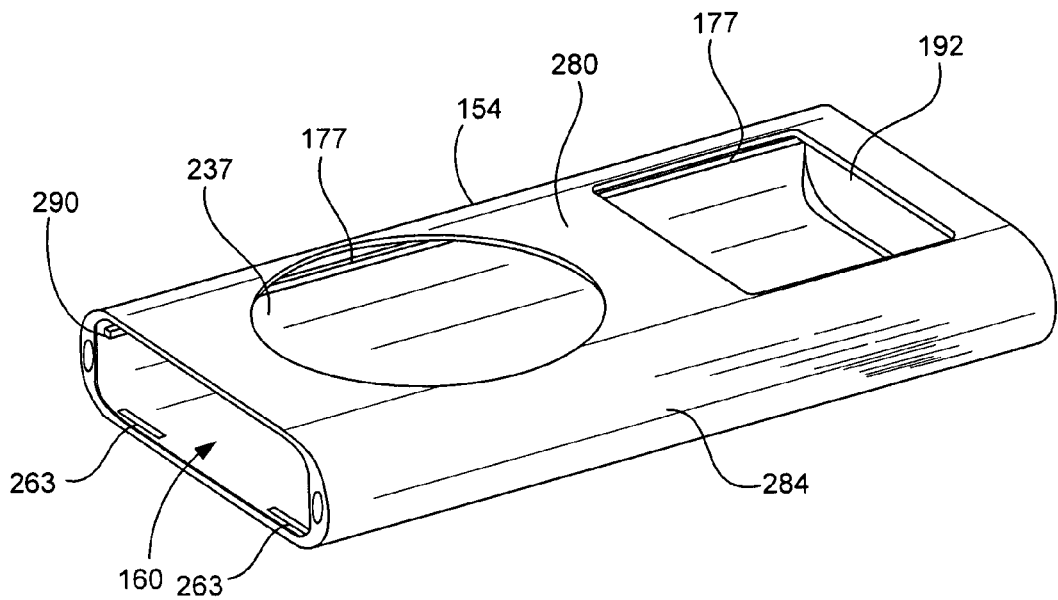
FIG. 9A is a front perspective view of a seamless enclosure, in accordance with one embodiment of the present invention.
Figure 9B:
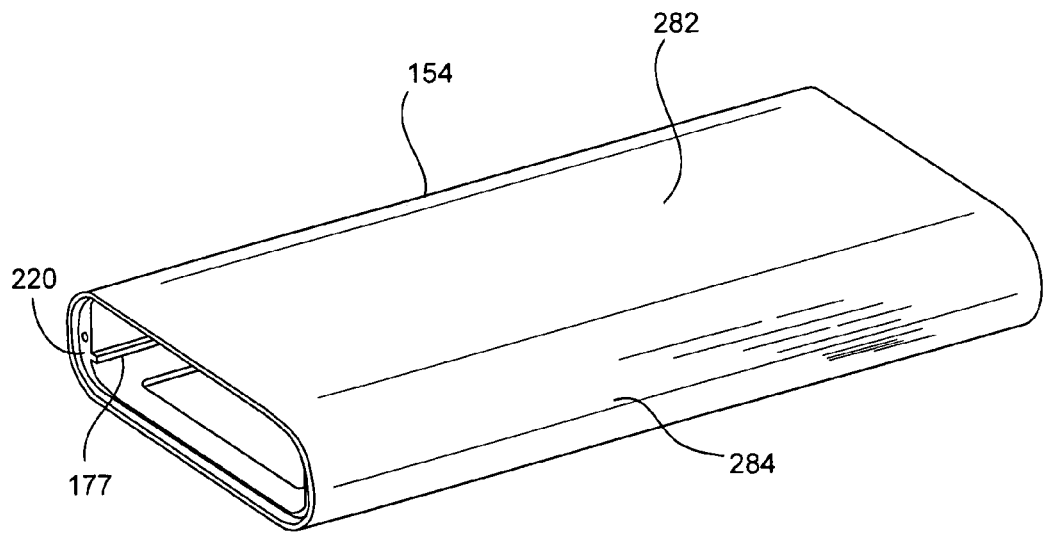
FIG. 9B is a rear perspective view of a seamless enclosure, in accordance with one embodiment of the present invention.
Figure 9C:
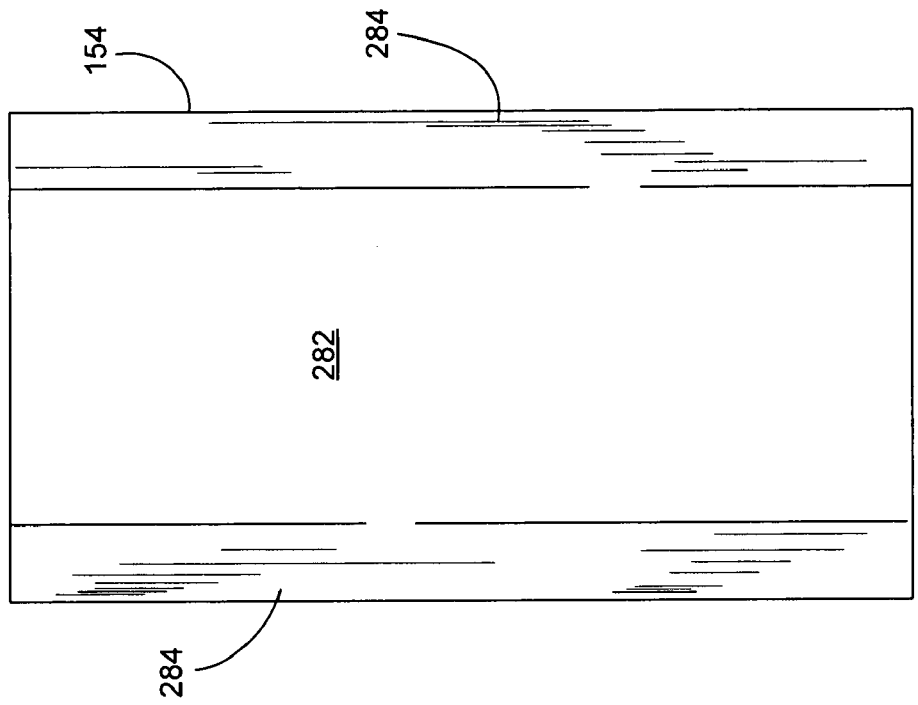
FIG. 9C is a front view of a seamless enclosure, in accordance with one embodiment of the present invention.
Figure 9D:
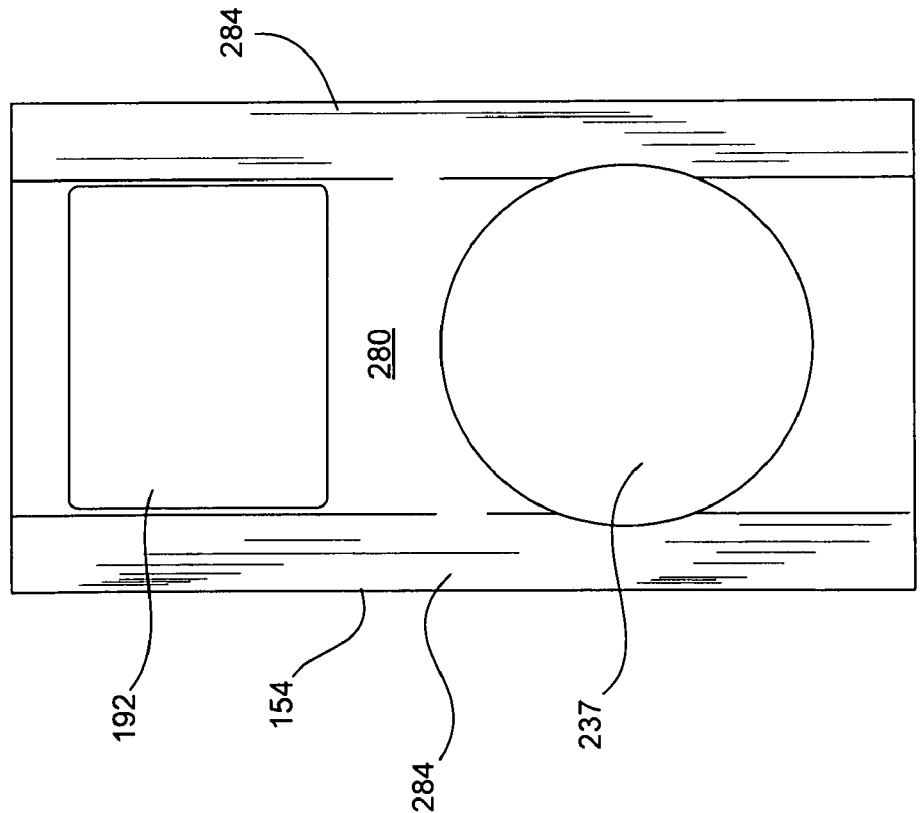
FIG. 9D is a rear view of a seamless enclosure, in accordance with one embodiment of the present invention.
Figure 9E:
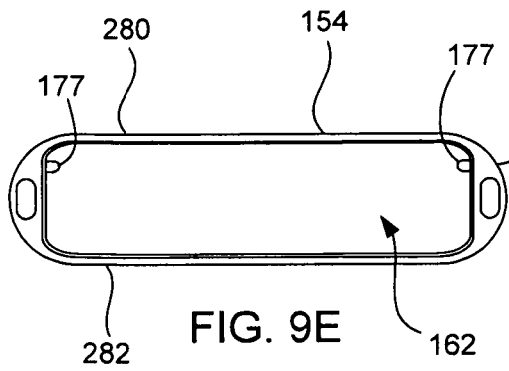
FIG. 9E is a top view of a seamless enclosure, in accordance with one embodiment of the present invention.
Figure 9F:
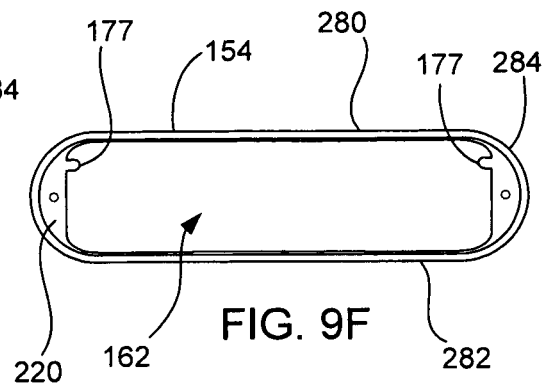
FIG. 9F is a bottom view diagram of a seamless enclosure, in accordance with one embodiment of the present invention.
Figure 9G:
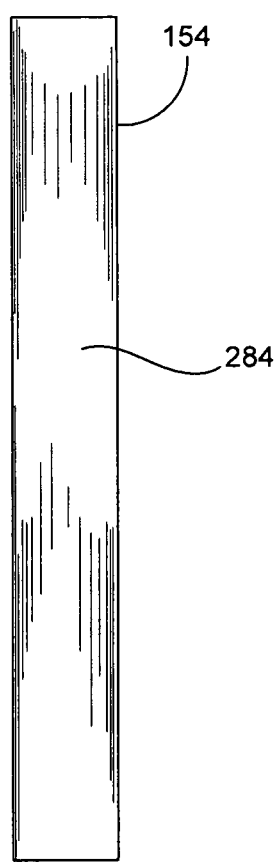
FIG. 9G is a right side view of a seamless enclosure, in accordance with one embodiment of the present invention.
Figure 9H:
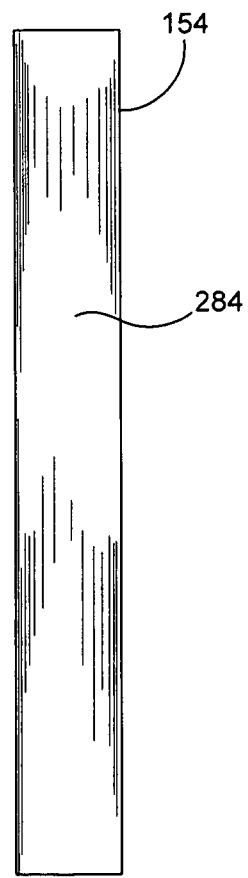
FIG. 9H is a left side view of a seamless enclosure, in accordance with one embodiment of the present invention.

FIG. 8 is a diagram of the audio subassembly 210, in accordance with one embodiment of the present invention. As shown in FIG. 8A, the PCB 212 is divided into a flexure portion 270, a first base portion 272 and a second base portion 274. This may be accomplished by cutting a groove in the PCB 212. The audio jack 214 is attached to the first base portion 272 and the top plate 218 is attached to the audio jack 214. The second base portion 274 includes a connector 276 that mates with a connector on the main PCB 180 in order to operatively and mechanically couple the audio subassembly 210 to the main PCB 180, i.e., form a single unit. The flexure portion 270 is positioned between the first and second base portions 272 and 274. The flexure portion 270 allows the first base portion 272 to move relative to the second base portion 274. The flexure 270 causes the first base portion 272 and thus the top plate 218 to float relative to the main PCB 180 while still being constrained thereto. As shown in FIGS. 8B and 8C, the flexure portion 270 is capable of flexing or bending so that the first base portion 272 can shift relative to the second base portion 274 thereby allowing the top plate 218 to be correctly aligned with the recess 220 of the seamless enclosure 154. That is, the flexure 270 allows the top plate 218 to shift into mating engagement with the recess 220 of the seamless enclosure 154 thereby producing a tight fit between the top plate 218 and the seamless enclosure 154.

FIGS. 9A-9H are various diagrams of the seamless enclosure 154. As shown, the seamless enclosure 154 includes a planar front surface 280, a back planar surface 282 and rounded sides 284. The access openings 192 and 237 for the LCD 190 and input assembly 230 are located in the front planar surface 280. The seamless enclosure 154 also includes a lumen 162 therethrough that defines openings at each of the ends of the seamless enclosure 154. The rails 177, which extend substantially through the lumen 162, are located in an opposed relationship inside the lumen 162. The rails 177 protrude away from the sides of the lumen 162 and are positioned closer to the front planar surface 280 than the back planar surface 282. The end at the top of the seamless enclosure 154 includes a recess 220 for receiving the top plate 218 and top end cap 158. The recess 220 essentially forms a lip to which the top plate 218 is secured. The end at the bottom of the seamless enclosure 154 includes a cut out section 290 for receiving the bottom plate 244 and the bottom end cap 156. The cut out 290 is formed by shortening the ends of the rails 177. This end also includes a plurality of slots 263 for receiving the flexure arms 246 of the bottom plate 244.

Figure 10:
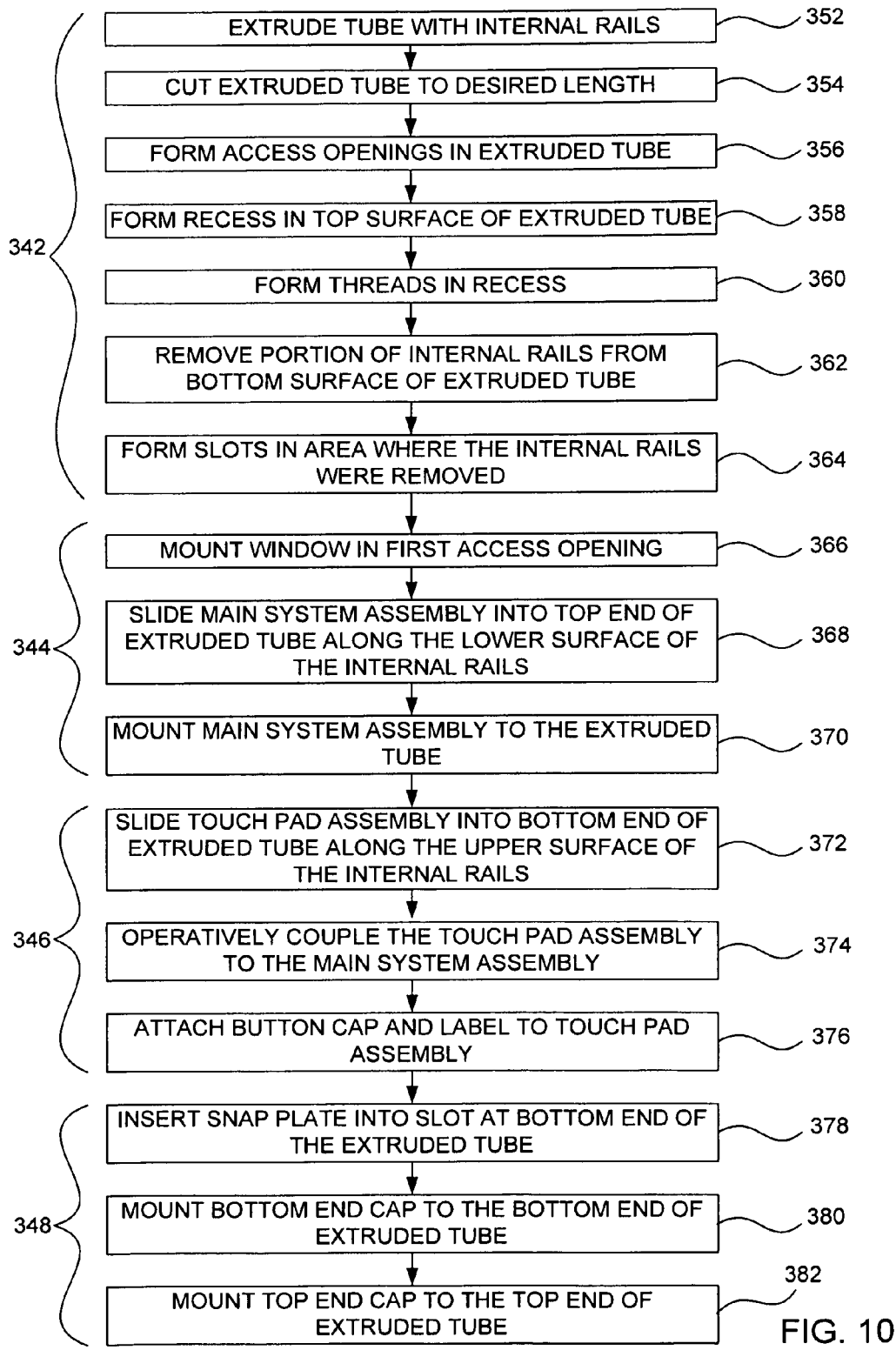
FIG. 10 is a method of manufacturing an electronic device, in accordance with one embodiment of the present invention.

FIG. 10 is a method of manufacturing an electronic device 340, in accordance with one embodiment of the present invention. The electronic device may generally correspond to any of those previously described. The method generally includes several operations including: the formation of the housing 342, the assembly of the internal components including the main system assembly 244 and the touch pad assembly 346, and the final assembly of the housing 348.

Referring first to the formation of the housing 342, the operation starts with block 352 where a tube having internal rails is extruded. Following block 352, the operation proceeds to block 354 where the extruded tube is cut to a desired length. Following block 354, the operation proceeds to block 356 where the access openings are formed in the extruded tube. By way of example, the access opening may be associated with a user interface of the electronic device. Following block 356, the operation proceeds to block 358 where a recess is formed into a top surface of the extruded tube. Following block 358, the operation proceeds to block 360 where one or more threads are formed in the recess at the top surface of the extruded tube. Following block 360, the operation proceeds to block 362 where a portion of the internal rails are removed from the bottom surface of the extruded tube. Following block 362, the operation proceeds to block 364 where slots are formed in the area where the internal rails were removed.

Referring to the assembly of the various components inside the tube 344, the operation starts with block 366 where a window is mounted in one of the access openings. This may for example be accomplished using an adhesive such as glue or tape. Following block 366, the operation proceeds to block 368 where a main system assembly is inserted into the top end of the extruded tube along the lower surface of the internal rails. The main system assembly is typically sized and dimensioned for sliding receipt between the lower surface of the internal rails and the side and back surface of the extruded tube. The main system assembly generally includes a printed circuit board, which acts as the carrier for several components including: system electronics (e.g., microprocessor and memory); an LCD; a battery; I/O assemblies (audio assembly, data port assembly); etc. Following block 368, the operation proceeds to block 370 where the main system assembly is mounted to the extruded tube. This is generally accomplished through a top plate that is attached to the main system assembly. When the main system assembly is finally inserted into the extruded tube, the top plate presses against the upper surface of the recess thereby setting the position of the main system assembly in its desired position along the longitudinal axis of the extruded tube. The top plate is then attached to the extruded tube via screws and the previously formed threads.

Referring to the assembly of the touch pad assembly 346, the operation starts with block 372 where the touch pad assembly is inserted into the bottom end of the extruded tube along the upper surface of the internal rails. The touch pad assembly is typically sized and dimensioned for sliding receipt between the upper surface of the rail and the side and front wall of the extruded tube. When the touch pad assembly is finally inserted into the extruded tube, the top surface of the touch pad assembly presses against a pair of abutment stops located at the bottom end of the window thereby setting the position of the touch pad assembly in its desired position along the longitudinal axis of the extruded tube. In particular, the touch pad of the touch pad assembly is positioned directly behind the second access opening.

Following block 372, the method proceeds to block 374 where the touch pad assembly is operatively coupled to the main system assembly. By way of example, a simple connector connection may be made or a solder connection can be made. In the illustrated embodiment, the touch pad assembly includes a flex connector that couples to a connector located on the PCB. Following block 374, the operation proceeds to block 376 where a button cap and label is situated over the touch pad of the touch pad assembly. The button cap is disposed over a center switch and the label is disposed over an edge of the button cap as well as the touch pad. The label is typically attached to the touch pad using an adhesive. In most cases, the label is positioned in the recessed area formed by the touch pad and the edge of the access opening. The label therefore helps to secure the touch pad assembly in its desired position within the extruded tube. Although not a requirement, the top surface of the label is typically positioned substantially flush with the outer surface of the extrude tube.

Referring to the final assembly of the device, the operation starts with block 378 where the snap plate is inserted into the slotted bottom end of the extruded tube thereby securing the snap plate to the extruded tube. Following block 378, the operation proceeds to block 380 where the bottom end cap is mounted to the bottom end of the extruded tube. This is generally accomplished by positioning the bottom end cap in the recessed area formed by the snap plate and the inner surface of the extruded tube, and snapping tabs located on the bottom end cap into the snap plate thereby securing the bottom end cap to the snap plate. In most cases, the outer surface of the bottom end cap is made flush with the bottom surface of the extruded tube. Following block 380, the operation proceeds to block 382 where the top end cap is mounted to the top end of the extruded tube. This is generally accomplished by positioning the top end cap in the recessed area formed by the top plate and the inner surface of the extruded tube, and snapping tabs located on the top end cap into the top plate thereby securing the top end cap to the top plate. It should be pointed out that during insertion of the top end cap into the recessed area, a protruding member of the audio assembly is inserted through an opening in the top end cap. Because the audio assembly includes a flexure, the protruding member has a small amount of tolerance or play that allows for easy placement through the opening. Once the top end cap is attached, the switch cap may be placed on the switch assembly through another opening in the top end cap.

While this invention has been described in terms of several preferred embodiments, there are alterations, permutations, and equivalents, which fall within the scope of this invention.

For example, although the invention is primarily directed at an integrally formed internal rail system, in some cases the internal rail system may be a separate component that is attached within the main body. It should also be noted that there are many alternative ways of implementing the methods and apparatuses of the present invention. For example, although an extrusion process is preferred method of manufacturing the integral tube, it should be noted that this is not a limitation and that other manufacturing methods may be used (e.g., injection molding). It is therefore intended that the following appended claims be interpreted as including all such alterations, permutations, and equivalents as fall within the true spirit and scope of the present invention.

What is claimed is:

1. A handheld music player, comprising:
   an elongated extruded tube extending along a longitudinal axis, and having a first open end and a second open end opposite the first open end, the elongated extruded tube defining an internal lumen which is sized and dimensioned for slidable receipt of operational components of the handheld music player, the lumen including rails and a securing mechanism for guiding the operational components to their desired position within the lumen, wherein the securing mechanism comprises a lumen locking feature configured to engage with a locking feature of an operational component to secure the operational component to the tube when the operational component is in its desired position within the lumen.

2. The handheld music player as recited in claim 1, wherein the rails define an upper channel and a lower channel inside the lumen, the upper channel receiving a first operational component, the lower channel receiving a second operational component, the first and second operational components being located relative to a front wall of the elongated extruded tube via the rails.

3. The handheld music player as recited in claim 1, wherein the operational components include at least a memory component that stores a large collection of music and a processing component that plays the music stored in the memory component.

4. The handheld music player as recited in claim 1, wherein the rails include a pair of rails that are placed in a opposed relationship and protrude from opposite sides of the lumen, the pair of rails being integrally formed with the elongated extruded tube, and wherein the elongated extruded tube defines a front wall, side walls and back wall of the handheld music player, the front wall including a first access opening and a second access opening, the handheld music player further including:
   a main control assembly containing a microprocessor, display, memory unit, battery connected to a printed circuit board, wherein the main control assembly is disposed in a space provided by the side walls and back wall of the extruded tube and the bottom surface of the pair of rails, the main control assembly being positioned along the longitudinal axis at a location that places the display directly behind the first access opening, the printed circuit board of the main control assembly abutting the bottom surface of the rails thereby locating the display in the direction of the front wall;
   an input assembly containing a touch pad and a button positioned on a frame, wherein the input assembly is disposed in a space provided by the side walls and top wall of the extruded tube and the top surface of the pair of rails, the input assembly being positioned along the longitudinal axis at a location that places it directly behind the second access opening, the bottom surface of the frame abutting the top surface of the rails, the rails locating the touch pad and button in the direction of the front wall; and
   a first end cap inserted at the first open end of the elongated extruded tube, and a top end cap inserted at the second open end of the elongated extruded tube, the first end cap defining a top wall of the handheld music player, the second end cap defining a bottom wall of the handheld music player, the end caps cooperating with the elongated extruded tube to form a fully contained housing of the handheld music player.

5. The handheld music player of claim 1, wherein the lumen locking feature comprises a recess in an inner wall of the tube and the locking feature of the operational component comprises a flexure tab.

6. A handheld computing device, comprising:
   an enclosure including an integral housing member that extends along a longitudinal axis and that includes an internal cavity therein, the integral housing member defining at least a front wall, side walls and back wall of the enclosure, the front wall having a substantially planar front surface, the planar front surface being configured to present a user interface sub-system of the handheld computing device through one or more access openings, the integral housing member having at least one open end and a pair of internal rails that extend parallel to the longitudinal axis and that protrude inwardly into the cavity from opposing side walls of the integral housing member, the open end being configured to receive the user interface sub-system therethrough during assembly of the handheld computing device, the internal rails being configured to locate the user interface sub-system in its desired position relative to the planar front surface of the enclosure when the user interface sub-system is positioned inside the cavity of the integral housing member of the enclosure of the handheld computing device, wherein the housing member includes a locking feature configured to engage with a locking feature on the user interface sub-system to secure the user interface sub-system to the housing member when the user interface sub-system is in its desired position inside the cavity.

7. The handheld computing device as recited in claim 6, wherein the integral housing member is formed from an extruded tube having a substantially seamless construction with a substantially uniform cross section along a longitudinal axis of the extruded tube.

8. The handheld computing device as recited in claim 6, wherein the user interface sub-system includes an output device assembly and an input device assembly, the output device assembly being presented through a first access opening of the integral housing member, the input device assembly being presented through a second access opening of the integral housing member.

9. The handheld computing device as recited in claim 6, wherein the locking feature of the housing member comprises a recess in an inner wall of the housing member, and the locking feature of the user interface sub-system comprises a flexure tab.

10. The handheld computing device as recited in claim 6, wherein the locking feature of the housing member comprises a snap on an inner wall of the housing member, and the locking feature of the user interface sub-system comprises a snap configured to engage with the snap on the inner wall of the housing member.

11. A handheld music player, comprising:
operational components including at least one user interface element; and
an elongated extruded tube extending along a longitudinal axis and having a substantially uniform cross section along the longitudinal axis, the elongated extruded tube having a first open end, a second open end opposite the first open end, and at least one access opening provided on a wall of the elongated extruded tube, the elongated extruded tube defining an internal lumen which is sized and dimensioned for slidable receipt of the operational components, the lumen including rails extending along the longitudinal axis for guiding the operational components to their desired position within the lumen so as to expose the user interface element through the access opening, wherein the lumen further includes a lumen locking feature configured to engage with a locking feature of an operational component to secure the operational component to the tube when the operational component is in its desired position within the lumen.

12. The handheld music player as recited in claim 11, wherein the rails have the same length as the elongated extruded tube.

13. The handheld music player as recited in claim 11, wherein the rails define an upper channel and a lower channel inside the lumen, the upper channel receiving a first operational component, the lower channel receiving a second operational component, the first and second operational components being positioned at respective predetermined locations with respect to a front wall of the elongated extruded tube.

14. The handheld music player as recited in claim 11, wherein the operational components include:
at least one memory component that stores a collection of music; and
a processing component that plays the music stored in the memory component.

15. The handheld music player as recited in claim 11,
wherein the elongated extruded tube defines a front wall, side walls and back wall of the handheld music player, the front wall including a first access opening and a second access opening,
wherein the rails are a pair of internal protrusions provided in opposed sides of the lumen along the respective side walls of the elongated extruded tube, the internal protrusions being integrally formed with the elongated extruded tube, each rail having a top surface facing an inner side of the front wall and a bottom surface facing an inner side of the back wall;
and wherein the operational components include:
a main control assembly having a printed circuit board, a microprocessor and a display connected to the printed circuit board, the main control assembly being inserted in the lumen such that an upper surface of the printed circuit board abuts the bottom surface of the rails, the display provided on the upper surface being disposed directly under the first access opening; and
an input assembly having an input device and a frame holding the input device, the input assembly being inserted in the lumen such that a lower surface of the frame abuts the top surface of the rails, the input device being disposed directly under the second access opening.

16. The handheld music player as recited in claim 15, wherein the main control assembly further includes a memory unit and a battery provided on a lower surface of the printed circuit board.

17. The handheld music player as recited in claim 15, further comprising:
an audio assembly operatively coupled with the print circuit board of the main control assembly.

18. The handheld music player as recited in claim 15, wherein the input device includes a touch pad and a switching button.

19. The handheld music player as recited in claim 15, further comprising:
a first end cap provided at the first open end of the elongated extruded tube, the first end cap defining a top wall of the handheld music player; and
a top end cap provided at the second open end of the elongated extruded tube, the second end cap defining a bottom wall of the handheld music player,
wherein the first and second end caps cooperates with the elongated extruded tube to form a fully contained housing of the handheld music player.

20. The handheld music player as recited in claim 11, wherein the lumen locking feature comprises a recess in an inner wall of the tube and the locking feature of the operational component comprises a flexure tab.

* * * * *

UNITED STATES PATENT AND TRADEMARK OFFICE
CERTIFICATE OF CORRECTION

| | | |
|---|---|---|
| PATENT NO. | : 7,649,744 B2 | Page 1 of 1 |
| APPLICATION NO. | : 12/395570 | |
| DATED | : January 19, 2010 | |
| INVENTOR(S) | : Stephen Paul Zadesky et al. | |

It is certified that error appears in the above-identified patent and that said Letters Patent is hereby corrected as shown below:

Title page 2, in column 2, under "Other Publications", line 6, delete "cfm?articieID" and insert -- cfm?articleID --, therefor.

Title page 2, in column 2, under "Other Publications", line 6, delete "Dowloaded" and insert -- Downloaded --, therefor.

Signed and Sealed this
Eleventh Day of October, 2011

David J. Kappos
*Director of the United States Patent and Trademark Office*